United States Patent
Hendry et al.

(10) Patent No.: US 12,470,738 B2
(45) Date of Patent: Nov. 11, 2025

(54) INTERLACED VIDEO CODING WITH LEADING PICTURES

(71) Applicant: Huawei Technologies Co., Ltd., Shenzhen (CN)

(72) Inventors: Fnu Hendry, San Diego, CA (US); Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/419,232

(22) Filed: Jan. 22, 2024

(65) Prior Publication Data

US 2024/0163467 A1    May 16, 2024

Related U.S. Application Data

(63) Continuation of application No. 17/492,352, filed on Oct. 1, 2021, now Pat. No. 12,041,256, which is a
(Continued)

(51) Int. Cl.
*H04N 7/12* (2006.01)
*H04N 19/159* (2014.01)
(Continued)

(52) U.S. Cl.
CPC ........... *H04N 19/46* (2014.11); *H04N 19/159* (2014.11); *H04N 19/172* (2014.11)

(58) Field of Classification Search
CPC .... H04N 19/46; H04N 19/159; H04N 19/172; H04N 19/44; H04N 19/70
See application file for complete search history.

(56) References Cited

U.S. PATENT DOCUMENTS

| 10,798,432 B2 | 10/2020 | Rodriguez et al. |
| 2014/0003537 A1 | 1/2014 | Ramasubramonian |

(Continued)

FOREIGN PATENT DOCUMENTS

| EP | 3975566 A1 | 3/2022 |
| EP | 3939290 B1 | 1/2024 |

(Continued)

OTHER PUBLICATIONS

Document: JVET-Q2001-vE, Benjamin Bross et al, Versatile Video Coding (Draft 8), Joint Video Experts Team (JVET) of ITU-T SG 16 WP 3 and ISO/IEC JTC 1/SC 29/WG 11, 17th Meeting: Brussels, BE, Jan. 7-17, 2020, 512 pages.
(Continued)

*Primary Examiner* — Gims S Philippe
(74) *Attorney, Agent, or Firm* — Conley Rose, P.C.

(57) ABSTRACT

A video coding mechanism is disclosed. The mechanism includes receiving a bitstream comprising a flag and a plurality of coded pictures including an intra random access point (IRAP) picture and one or more non-leading pictures associated with the IRAP picture. When the flag is set to a first value any leading pictures associated with the IRAP picture precede, in decoding order, all non-leading pictures associated with the IRAP picture. When the flag is set to a second value a non-leading picture precedes, in decoding order, an initial leading picture associated with the IRAP picture. The IRAP picture, any leading pictures associated with the IRAP picture, and the one or more non-leading pictures associated with the IRAP picture are decoded in decoding order based on the flag.

9 Claims, 12 Drawing Sheets

Related U.S. Application Data continuation of application No. PCT/US2020/026457, filed on Apr. 2, 2020.

(60) Provisional application No. 62/864,958, filed on Jun. 21, 2019, provisional application No. 62/828,875, filed on Apr. 3, 2019.

(51) Int. Cl.
*H04N 19/172* (2014.01)
*H04N 19/46* (2014.01)

(56) References Cited

U.S. PATENT DOCUMENTS

| | | | |
|---|---|---|---|
| 2014/0079140 A1* | 3/2014 | Wang | H04N 19/197 375/240.26 |
| 2015/0016546 A1* | 1/2015 | Wang | H04N 19/597 375/240.26 |
| 2016/0112709 A1 | 4/2016 | Tsukagoshi | |
| 2016/0219301 A1 | 7/2016 | Pettersson | |
| 2016/0234527 A1 | 8/2016 | Rodriguez et al. | |
| 2017/0105004 A1 | 4/2017 | Chen | |
| 2019/0394494 A1 | 12/2019 | Sakurai | |
| 2020/0213604 A1* | 7/2020 | Choi | H04N 19/70 |
| 2021/0227239 A1 | 7/2021 | Choi et al. | |

FOREIGN PATENT DOCUMENTS

| | | |
|---|---|---|
| WO | 2015025747 A1 | 2/2015 |
| WO | 2018150934 A1 | 8/2018 |

OTHER PUBLICATIONS

Document: JVET-M1001-v6, Benjamin Bross et al., Versatile Video Coding (Draft 4), Joint Video Experts Team (JVET) of ITU-T SG 16 WP 3 and ISO/IEC JTC 1/SC 29/WG 11, 13th Meeting: Marrakech, MA, Jan. 9-17, 2019, 299 pages.

Document: JCTVC-Q0116, Rickard Sjoberg, RExt HLS: Picture referencing across CRA pictures, Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, 4 pages.

Bross, B., et al., "Versatile Video Coding (Draft 6)", Joint Video Experts Team (JVET) of ITU-T SG 16 WP 3 and ISO/IEC JTC 1/SC 29/WG 11, 15th Meeting: Gothenburg, SE, JVET-O2001-vE, Jul. 3-12, 2019, 170 pages.

Bross, B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, JVET-M1001-v7, Jan. 9-18, 2019, 302 pages.

Drugeon, V., et al., "AHG17: On constraint about position of leading pictures and trailing pictures associated to an IRAP", Joint Video Experts Team (JVET) of ITU-T SG 16 WP 3 and ISO/IEC JTC 1/SC 29/WG 11, 15th Meeting: Gothenburg, SE, JVET-O0226, Jul. 3-12, 2019, 3 pages.

Hendry, et al., "AHG17: Constraints on IRAP pictures and leading pictures", Joint Video Experts Team (JVET) of ITU-T SG 16 WP 3 and ISO/IEC JTC 1/SC 29/WG 11, 15th Meeting: Gothenburg, SE, JVET-O0147-v1, Jul. 3-12, 2019, 2 pages.

"Series H: Audiovisual and Multimedia Systems Infrastructure of audio visual services—Coding of moving video, High Efficiency video coding," Recommendation ITU-T H. 265 Dec. 2016, 7 pages.

Sjoberg, R., et al., "Rext HLS: Picture referencing across CRA pictures," Joint Collaborative Team on Video Coding (JCT-VC) of ITU-T SG 16WP 3 and ISO/IEC JTC 1/SC 29/WG 11 17th Meeting: Valencia, ES, Mar. 27-Apr. 4, 2014, 5 pages.

"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.

"High Efficiency Video Coding," Series H: Audiovisual and Multimedia Systems Infrastructure of Audiovisual Services—Coding of Moving Video, ITU-T H.265, Dec. 2016, 664 pages.

"Line Transmission of Non-Telephone Signals, Video Codec for Audiovisual Services at p x 64 kbits," ITU-T Recommendation H.261, Mar. 3, 1993, 29 pages.

"Transmission of Non-Telephone Signals, Information Technology—Generic Coding of Moving Pictures and Associated Audio Information: Video," ITU-T H.262, Jul. 1995, 211 pages.

"Video Coding for Low Bit Rate Communication," Series H: Audiovisual and Multimedia Systems Infrastructure of Audiovisual Services—Coding of Moving Video, ITU-T H.263, Jan. 2005, 226 pages.

Bross, et al., "Versatile Video Coding (Draft 4)," Joint Video Experts Team (JVET) of ITU-T SG 16 WP 3 and ISO/IEC JTC 1/SC 29/WG 11, 13th Meeting: Marrakech, MA Jan. 9-18, 2019, Document JVET-M1001v7, 300 pages.

Document: JVET-P0334-v1, Wang, B et al., "AHG17: On constant slice header parameter set in PPS", Joint Video Experts Team (JVET) of ITU-T SG 16 WP 3 and ISO/IEC JTC 1/SC 29/WG 11 16th Meeting: Geneva, CH, Oct. 1-11, 2019, 7 pages.

Document: JVET-O2001-vE, Bross, B., et al., "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, XP030206332, 170 pages.

Document: JVET-M1001-v7, Bross, B., et al., "Versatile Video Coding (Draft 6)," Joint Video Experts Team (JVET) of ITU-T SG 16 WP 3 and ISO/IEC JTC 1/SC 29/WG 11 13th Meeting: Marrakech, MA, Jan. 9-18, 2019, XP030212438, 302 pages.

\* cited by examiner

1000

```
┌─────────────────────────────────────────────────────────────┐
│ Determine a coding order for a video sequence comprising   │
│ plurality of pictures including IRAP picture, leading      │ ─ 1001
│ pictures (if any) and one or more non-leading pictures.    │
└─────────────────────────────────────────────────────────────┘
                            │
                            ▼
┌─────────────────────────────────────────────────────────────┐
│ Encode an SPS containing a flag into a bitstream. The flag │
│ is set to a first value when any leading pictures          │
│ associated with the IRAP picture precede, in coding order, │
│ all non-leading pictures associated with the IRAP picture. │ ─ 1003
│ The flag is set to a second value when a non-leading       │
│ picture precedes, in coding order, an initial leading      │
│ picture associated with the IRAP picture and no leading    │
│ pictures are positioned between the initial leading        │
│ picture and a final leading picture in coding order.       │
└─────────────────────────────────────────────────────────────┘
                            │
                            ▼
┌─────────────────────────────────────────────────────────────┐
│ Encode the IRAP picture, any leading pictures, and the one │ ─ 1005
│ or more non-leading pictures into the bitstream in coding  │
│ order.                                                      │
└─────────────────────────────────────────────────────────────┘
                            │
                            ▼
┌─────────────────────────────────────────────────────────────┐
│ Store the bitstream for communication toward a decoder.    │ ─ 1007
└─────────────────────────────────────────────────────────────┘
```

FIG. 10

000
INTERLACED VIDEO CODING WITH LEADING PICTURES

CROSS-REFERENCE TO RELATED APPLICATIONS

This application is a continuation of U.S. patent application Ser. No. 17/492,352 filed on Oct. 1, 2021, which is a continuation of International Application No. PCT/US2020/026457 filed on Apr. 2, 2020, which claims the benefit of U.S. Provisional Patent Application No. 62/828,875 filed Apr. 3, 2019, and U.S. Provisional Patent Application No. 62/864,958 filed Jun. 21, 2019, which are hereby incorporated by reference in their entireties.

TECHNICAL FIELD

The present disclosure is generally related to video coding, and is specifically related to coding of leading pictures in an interlaced video coding context.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in a decoder, the method comprising: receiving, by a receiver of the decoder, a bitstream comprising a flag and a plurality of coded pictures including an intra random access point (IRAP) picture and one or more non-leading pictures associated with the IRAP picture; determining, by the processor, any leading pictures associated with the IRAP picture precede, in decoding order, all non-leading pictures associated with the IRAP picture when the flag is set to a first value; determining, by the processor, a non-leading picture precedes, in decoding order, an initial leading picture associated with the IRAP picture when the flag is set to a second value; decoding, by the processor, the IRAP picture, any leading pictures associated with the IRAP picture, and the one or more non-leading pictures associated with the IRAP picture in decoding order based on whether the flag is set to the first value or the second value; and forwarding, by the processor, one or more decoded pictures for display as part of a decoded video sequence.

Versatile video coding (VVC) video systems may employ a bitstream that includes IRAP pictures, leading pictures, and non-leading pictures. Non-leading pictures can also be referred to as trailing pictures in some examples. An IRAP picture is an intra-prediction coded picture that acts as the start of a coded video sequence. A leading picture is a picture that precedes the IRAP picture in presentation order, but is coded after the IRAP picture in coding order. A non-leading picture/trailing picture is a picture that follows the IRAP picture in both presentation order and coding order. Some video coding systems require that leading pictures immediately follow the IRAP picture in decoding order and that all non-leading pictures follow the leading pictures. Interlaced video coding is a mechanism that increases perceived frame rate without increasing streaming bandwidth. In interlaced video coding, a video frame is split into two fields. Horizontal lines for a first field of a frame are captured at a first time and coded in a first picture. Horizontal lines for a second field of a frame are captured at a second time and coded in a second picture immediately adjacent to the first picture. In this way, the resulting frame includes slices from a first picture at a first time and slices from a second picture at a second, which increases the sense of movement. VVC systems may not be designed to support interlaced video. For example, an interlaced frame may employ an IRAP picture and an adjacent intra-prediction coded picture to function. The intra-prediction coded picture is considered to be non-leading/trailing pictures. Further, when leading pictures are employed, the leading pictures would be positioned after that adjacent intra-prediction coded picture. This violates the VVC constraint that leading pictures immediately follow the IRAP picture in decoding order and that all non-leading pictures follow the leading pictures. The present example includes a flag that can be employed to implement interlaced video coding in a VVC system employing leading pictures. When the flag is set to a first value, such as zero, leading pictures, if any, precede all of the non-leading pictures. However, the encoder can set the flag to a second value, such as one, to indicate to the decoder that a single non-leading picture is positioned between the RAP picture and any leading pictures. In an example, non-leading pictures may not be positioned between the leading pictures. The flag can be included in a sequence parameter set (SPS) and can apply to an entire sequence of pictures. Accordingly, the present example includes a flag that increases the functionality of an encoder and/or a decoder by allowing leading pictures and interlaced video to be implemented together in the same bitstream. Further, the present example increases coding efficiency of the resulting bitstream by allowing leading pictures and interlaced video to be implemented together. As such, the present example may reduce the use of processor resources, memory resources, and/or network resources at the encoder and/or at the decoder.

Optionally, in any of the preceding aspects, another implementation of the aspect provides, further comprising determining, by the processor, that no leading pictures are positioned between the initial leading picture and a final leading picture in decoding order when the flag is set to the second value.

Optionally, in any of the preceding aspects, another implementation of the aspect provides, wherein the bitstream includes a SPS, and wherein the flag is obtained from the SPS.

Optionally, in any of the preceding aspects, another implementation of the aspect provides, wherein the flag is a sequential field flag (field_seq_flag).

Optionally, in any of the preceding aspects, another implementation of the aspect provides, wherein the field_seq_flag is set to one when indicating that a coded video sequence includes pictures that represent fields, and wherein the field_seq_flag is set to zero when indicating that the coded video sequence includes pictures that represent frames.

Optionally, in any of the preceding aspects, another implementation of the aspect provides, wherein the IRAP picture includes a first field of a frame, and wherein the non-leading picture preceding the initial leading picture includes a second field of the frame.

Optionally, in any of the preceding aspects, another implementation of the aspect provides, wherein decoding the IRAP picture and the one or more non-leading pictures includes interlacing the first field from the IRAP picture and the second field from the non-leading picture preceding the initial leading picture to create a single frame.

In an embodiment, the disclosure includes a method implemented in an encoder, the method comprising: determining, by a processor of the encoder, a coding order for a video sequence comprising plurality of pictures including an IRAP picture and one or more non-leading pictures associated with the IRAP picture; encoding, by the processor, a flag into a bitstream, wherein the flag is set to a first value when any leading pictures associated with the IRAP picture precede, in coding order, all non-leading pictures associated with the IRAP picture, and wherein the flag is set to a second value when a non-leading picture precedes, in coding order, an initial leading picture associated with the IRAP picture; encoding, by the processor, the IRAP picture, any leading pictures associated with the IRAP picture, and the one or more non-leading pictures associated with the IRAP picture into the bitstream in coding order; and storing, by a memory coupled to the processor, the bitstream for communication toward a decoder.

VVC video systems may employ a bitstream that includes IRAP pictures, leading pictures, and non-leading pictures. Non-leading pictures can also be referred to as trailing pictures in some examples. An IRAP picture is an intra-prediction coded picture that acts as the start of a coded video sequence. A leading picture is a picture that precedes the IRAP picture in presentation order, but is coded after the IRAP picture in coding order. A non-leading picture/trailing picture is a picture that follows the IRAP picture in both presentation order and coding order. Some video coding systems require that leading pictures immediately follow the IRAP picture in decoding order and that all non-leading pictures follow the leading pictures. Interlaced video coding is a mechanism that increases perceived frame rate without increasing streaming bandwidth. In interlaced video coding, a video frame is split into two fields. Horizontal lines for a first field of a frame are captured at a first time and coded in a first picture. Horizontal lines for a second field of a frame are captured at a second time and coded in a second picture immediately adjacent to the first picture. In this way, the resulting frame includes slices from a first picture at a first time and slices from a second picture at a second, which increases the sense of movement. VVC systems may not be designed to support interlaced video. For example, an interlaced frame may employ an IRAP picture and an adjacent intra-prediction coded picture to function. The intra-prediction coded picture is considered to be non-leading/trailing pictures. Further, when leading pictures are employed, the leading pictures would be positioned after that adjacent intra-prediction coded picture. This violates the VVC constraint that leading pictures immediately follow the IRAP picture in decoding order and that all non-leading pictures follow the leading pictures. The present example includes a flag that can be employed to implement interlaced video coding in a VVC system employing leading pictures. When the flag is set to a first value, such as zero, leading pictures, if any, precede all of the non-leading pictures. However, the encoder can set the flag to a second value, such as one, to indicate to the decoder that a single non-leading picture is positioned between the IRAP picture and any leading pictures. In an example, non-leading pictures may not be positioned between the leading pictures. The flag can be included in a SPS and can apply to an entire sequence of pictures. Accordingly, the present example includes a flag that increases the functionality of an encoder and/or a decoder by allowing leading pictures and interlaced video to be implemented together in the same bitstream. Further, the present example increases coding efficiency of the resulting bitstream by allowing leading pictures and interlaced video to be implemented together. As such, the present example may reduce the use of processor resources, memory resources, and/or network resources at the encoder and/or at the decoder.

Optionally, in any of the preceding aspects, another implementation of the aspect provides, wherein no leading pictures are positioned between the initial leading picture and a final leading picture in coding order when the flag is set to the second value.

Optionally, in any of the preceding aspects, another implementation of the aspect provides, herein the bitstream includes a SPS, and wherein the flag is encoded into the SPS.

Optionally, in any of the preceding aspects, another implementation of the aspect provides, wherein the flag is a field_seq_flag.

Optionally, in any of the preceding aspects, another implementation of the aspect provides, wherein the field_seq_flag is set to one when indicating that a coded video sequence includes pictures that represent fields, and wherein the field_seq_flag is set to zero when indicating that the coded video sequence includes pictures that represent frames.

Optionally, in any of the preceding aspects, another implementation of the aspect provides, wherein the IRAP picture includes a first field of a frame, and wherein the non-leading picture preceding the initial leading picture includes a second field of the frame.

Optionally, in any of the preceding aspects, another implementation of the aspect provides, wherein the first field from the IRAP picture and the second field from the non-leading picture preceding the initial leading picture include alternating lines of video data that represent a single interlaced video frame.

In an embodiment, the disclosure includes a video coding device comprising: a processor, a receiver coupled to the processor, a memory coupled to the processor, and a transmitter coupled to the processor, wherein the processor, receiver, memory, and transmitter are configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving a bitstream comprising a flag and a plurality of coded pictures including an IRAP picture and one or more non-leading pictures associated with the IRAP picture; a determining means for: determining any leading pictures associated with the IRAP picture precede, in decoding order, all non-leading pictures associated with the IRAP picture when the flag is set to a first value; and determining a non-leading picture precedes, in decoding order, an initial leading picture associated with the IRAP picture when the flag is set to a second value; a decoding means for decoding the IRAP picture, any leading pictures associated with the IRAP picture, and the one or more non-leading pictures associated with the IRAP picture in decoding order based on whether the flag is set to the first value or the second value; and a forwarding means for forwarding one or more decoded pictures for display as part of a decoded video sequence.

Optionally, in any of the preceding aspects, another implementation of the aspect provides, wherein the decoder is further configured to perform the method of any of the preceding aspects.

In an embodiment, the disclosure includes an encoder comprising: a determining means for determining a coding order for a video sequence comprising plurality of pictures including an IRAP picture and one or more non-leading pictures associated with the IRAP picture; an encoding means for: encoding a flag into a bitstream, wherein the flag is set to a first value when any leading pictures associated with the IRAP picture precede, in coding order, all non-leading pictures associated with the IRAP picture, and wherein the flag is set to a second value when a non-leading picture precedes, in coding order, an initial leading picture associated with the IRAP picture; and encoding the IRAP picture, any leading pictures associated with the IRAP picture, and the one or more non-leading pictures associated with the IRAP picture into the bitstream in coding order; and a storing means for storing the bitstream for communication toward a decoder.

Optionally, in any of the preceding aspects, another implementation of the aspect provides, wherein the encoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 10 is a flowchart of an example method of encoding a video sequence with interlaced video coding and leading pictures into a bitstream.

DETAILED DESCRIPTION

Figure 1:
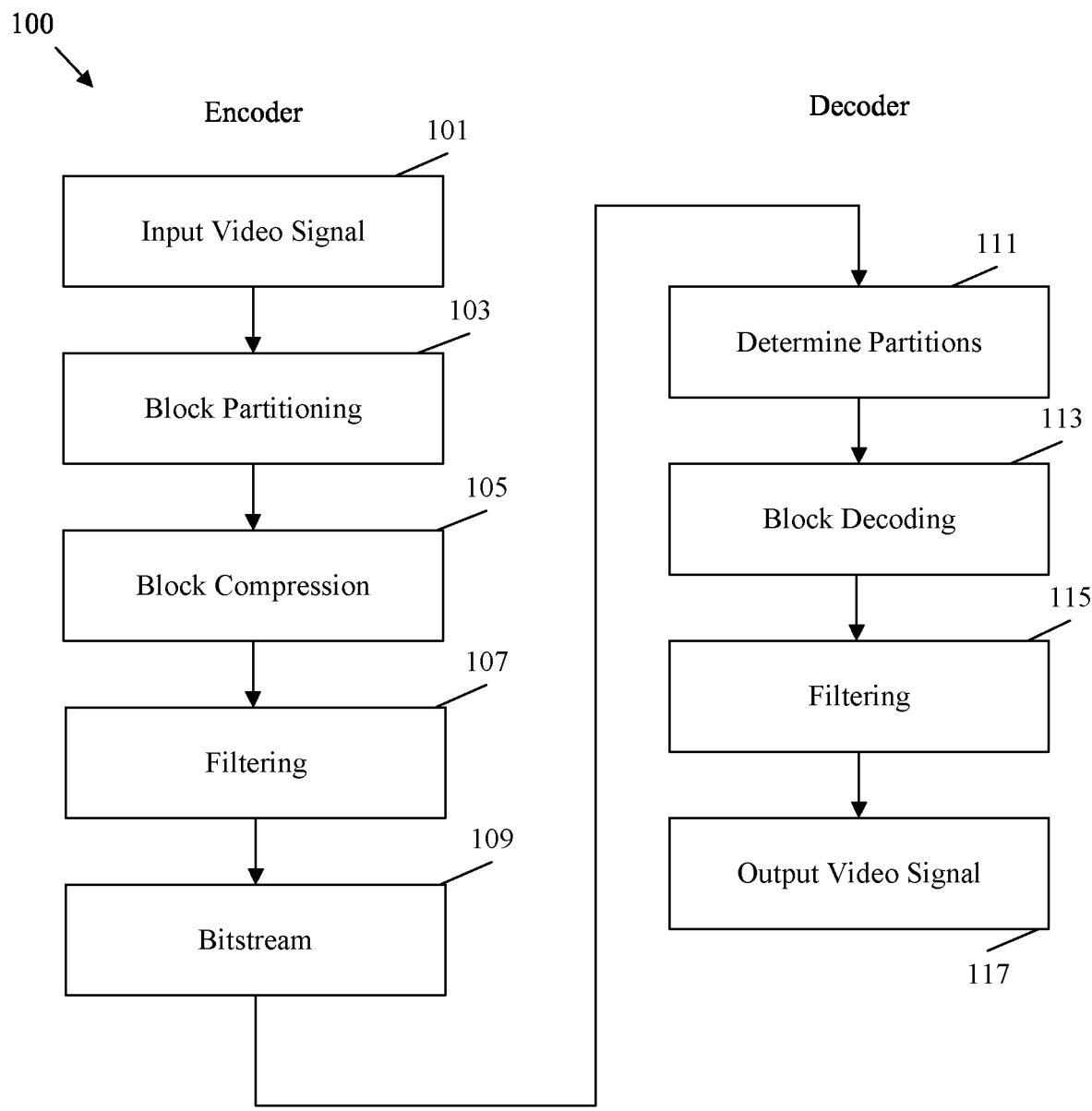
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A flag is a bit or group of bits coded into a bitstream that signals mechanisms employed by an encoder during encoding, and hence indicates mechanisms to be employed by a decoder during decoding accurately reconstruct video data from the bitstream. Intra-prediction is a mechanism of coding a picture in reference to itself such that the picture can be reconstructed without referencing other pictures. Inter-prediction is a mechanism of coding a picture by reference to one or more other pictures. An intra random access point (IRAP) pictures is a picture that is coded according to intra-prediction and that acts as a starting point for a coded video sequence. A leading picture is a picture coded after an associated IRAP picture in coding order, but preceding the associated IRAP picture in output order. A non-leading picture, which may also be referred to as a trailing picture, is a picture that follows an IRAP picture in both coding order and output order. Interlaced video coding is a video coding mechanism that codes a first field of video data at a first time in a first picture, codes a second field of video data at a second time in a second picture, and combines the first field and the second field into a single frame for presentation in order to provide the impression of increased frame rate. A frame is a complete image that is intended for complete or partial display to a user at a corresponding instant in a video sequence. A picture is a frame except for contexts related to interlaced video in which case a picture is a field of a frame. A parameter set is a portion of a bitstream that signals data, such as flags and other video parameters, for corresponding section of a coded video sequence. A sequential field flag (field_seq_flag) is a flag, which is used for interlaced video and that signals when a non-leading picture is positioned between an IRAP picture and leading pictures in coding order.

The following acronyms are used herein, Coding Tree Block (CTB), Coding Tree Unit (CTU), Coding Unit (CU), Coded Video Sequence (CVS), Joint Video Experts Team (JVET), Motion Constrained Tile Set (MCTS), Maximum Transfer Unit (MTU), Network Abstraction Layer (NAL), Picture Order Count (POC), Raw Byte Sequence Payload (RBSP), Sequence Parameter Set (SPS), and Working Draft (WD).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-M1001-v7.

Video coding systems may encode video by employing IRAP pictures and non-IRAP pictures. IRAP pictures are pictures coded according to intra-prediction that serve as random access points for a video sequence. In intra-prediction, blocks of a picture are coded by reference to other blocks in the same picture. This is in contrast to non-IRAP pictures that employ inter-prediction. In inter-prediction, blocks of a current picture are coded by reference to other blocks in a reference picture that is different from the current picture. Since an IRAP picture is coded without reference to other pictures, the IRAP picture can be decoded without first decoding any other pictures. Accordingly, a decoder can begin decoding a video sequence at any IRAP picture. In contrast, a non-IRAP picture is coded in reference to other pictures, and hence a decoder is generally unable to begin decoding a video sequence at a non-IRAP picture. IRAP pictures may also refresh the decoded picture buffer (DPB). This is because the IRAP picture is a starting point for a coded video sequence (CVS), and pictures in the CVS do not refer to pictures in the prior CVS. As such, IRAP pictures can also stop inter-prediction related coding errors because such errors cannot propagate through the IRAP picture. However, IRAP pictures are significantly larger than non-IRAP pictures from a data size standpoint. As such, a video sequence generally includes many non-IRAP pictures with a smaller number of interspersed IRAP pictures to balance coding efficiency with functionality. For example, a sixty frame CVS may include one IRAP picture and fifty nine non-IRAP pictures. Accordingly, IRAP pictures reduce compression efficiency in a bitstream. Further, the presence of an IRAP picture in a bitstream causes a surge in bit-rate. This penalty to the compression efficiency is caused in part by the fact that intra-prediction employs significantly more bits to represent a picture than inter-prediction. Further, IRAP pictures may refresh the decoding process and remove reference pictures from the DPB. This reduces the number of available reference pictures for inter-prediction when coding the pictures following the IRAP picture, and hence temporarily reduces the efficiency of the inter-prediction process.

Video coding systems may also employ leading pictures. A leading picture is a picture that is positioned after an IRAP picture in coding order and before the IRAP picture in presentation order. Leading pictures may be employed when a corresponding picture can be efficiently predicted from the IRAP picture even though the picture should be presented prior to the IRAP picture. Such a picture is positioned after the IRAP picture in coding order to allow the IRAP picture to be employed as a reference picture for inter-prediction. The decoder can then swap the order of the leading picture and the IRAP picture prior to presentation to create a different presentation order. Leading pictures may include random access skipped leading (RASL) pictures and random access decodable leading (RADL) pictures. A RASL picture may also rely on pictures prior to the IRAP picture and is skipped when the IRAP picture is used as a random access point. This is because such other pictures are not decoded, and are therefore not available as such other reference pictures when decoding starts from the IRAP picture. A RADL picture relies only upon the IRAP picture or other pictures between the RADL picture and the IRAP picture for reference. Hence, RADL pictures are decoded even when the IRAP is used as a random access point. This is because any picture the RADL picture may reference is guaranteed to be decoded even when coding starts at the IRAP picture. Video coding systems may require that leading pictures be positioned immediately following the IRAP picture they reference in decoding order. Any associated trailing pictures then follow the leading pictures in decoding order.

Video coding employs a wide range of mechanisms. For example, interlaced coding codes a frame into more than one field and into more than one picture. For example, a frame may be divided into an even field and odd field. An even field of an interlaced frame contains samples from the even numbered horizontal lines of the frame and an odd field of an interlaced frame contains samples from the odd numbered horizontal lines of the frame. As a specific example, the even field may be captured at a first time and stored in a first picture. The odd field can then be captured at a second time and stored in a second picture. Including the two fields into the same frame increases the sense of motion. As such, interlaced coding creates the impression of an increased frame rate without increasing the bandwidth of the video sequence. Interlaced coding may not be natively supported by standardized coding systems. However, interlaced coding may be managed in some systems by employing syntax elements in video usability information (VUI) to indicate a bitstream is an interlaced coded bitstream. Such syntax elements may include a field_seq_flag a general_frame_only_constraint_flag.

Standardized video coding systems that employ leading pictures are not configured to support interlaced video coding. For example, VVC and HEVC may employ a coding order that requires an IRAP picture to be followed by leading pictures, if any. The leading pictures are then followed by non-leading/trailing pictures. Such an order prevents non-leading pictures from being positioned between the IRAP picture and associated leading pictures. However, in an interlaced video coding context, the IRAP frame is split between two fields in two pictures. The first picture with the first field is coded as an IRAP picture. The second picture with the second field is coded as a non-leading/trailing picture instead of as an IRAP picture because the second picture cannot be used as a random access point. This is because both pictures are needed to begin decoding, and hence the first picture cannot be skipped. The two pictures that make up the IRAP frame should be positioned next to each other for efficient coding. However, positioning the non-leading picture with the second IRAP field adjacent to the IRAP picture with the first IRAP field violates the VVC and HEVC coding order. This is because such a positioning places a non-leading picture prior to any leading pictures.

Disclosed herein are mechanisms to configure a video coding system that employs leading pictures to encode interlaced video. For example, a flag can be employed to implement interlaced video coding into a VVC system employing leading pictures. The flag can be employed to signal to a decoder when a non-leading picture may be present between the IRAP picture and any leading pictures. The decoder can read the flag and adjust the ordering as desired to support interlaced video coding. When the flag is set to a first value, such as zero, leading pictures, if any, precede all of the non-leading pictures. However, the encoder can set the flag to a second value, such as one, to indicate to the decoder that a single non-leading picture is positioned between the IRAP picture and any leading pictures. In an example, non-leading pictures may not be positioned between the leading pictures. For example, a sequential field flag (field_seq_flag) can be employed for this purpose. The flag can be included in a sequence parameter set (SPS) and can apply to an entire sequence of pictures. It should be noted that, in the interlaced video context, a frame may include multiple pictures (e.g., two). However, outside of the interlaced video context, a frame includes a single picture and hence the term frame and the term picture may be used interchangeably. Accordingly, usage of the terms frame and picture below should not be considered limiting unless used in the context of interlaced coding.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
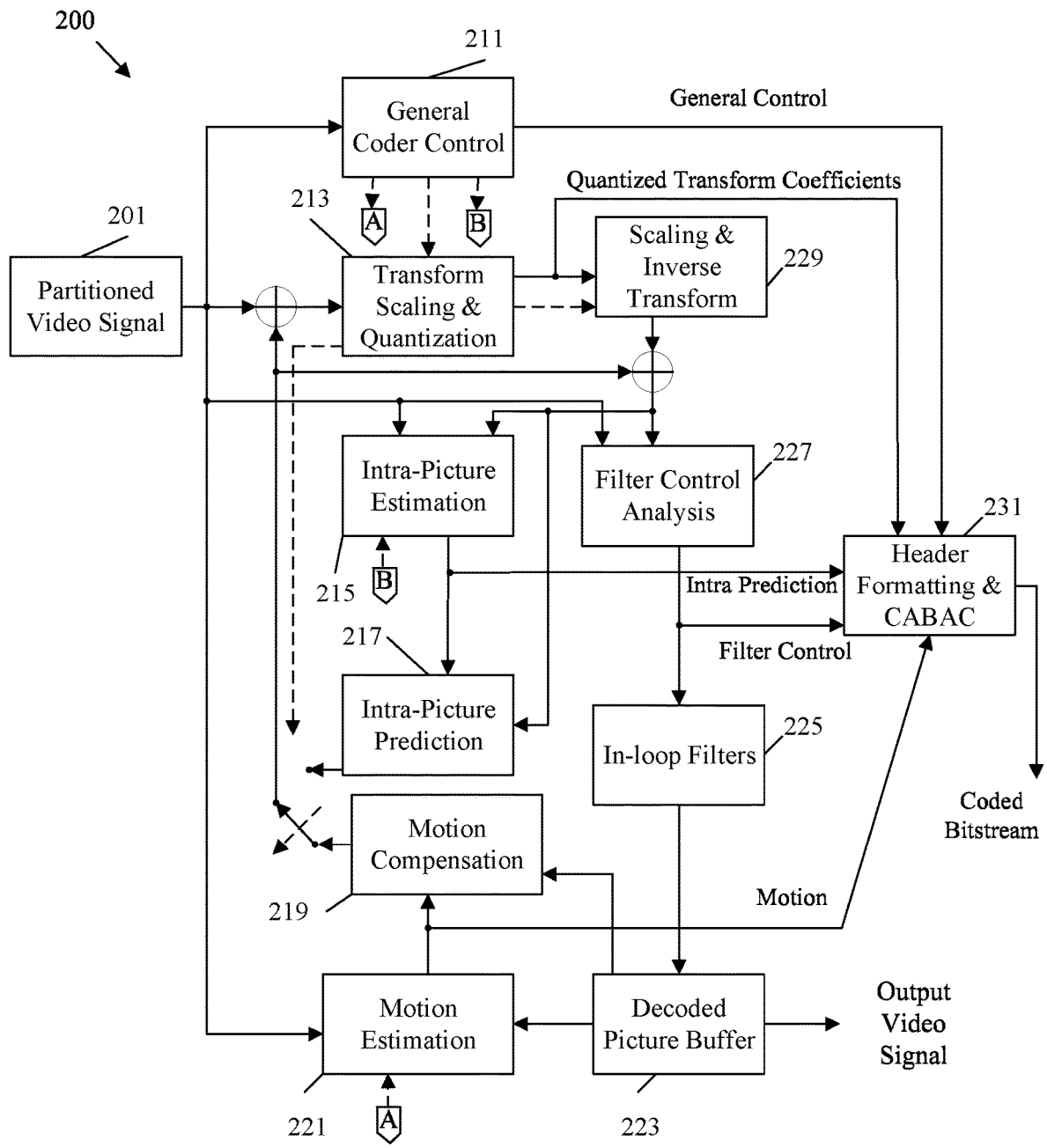
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
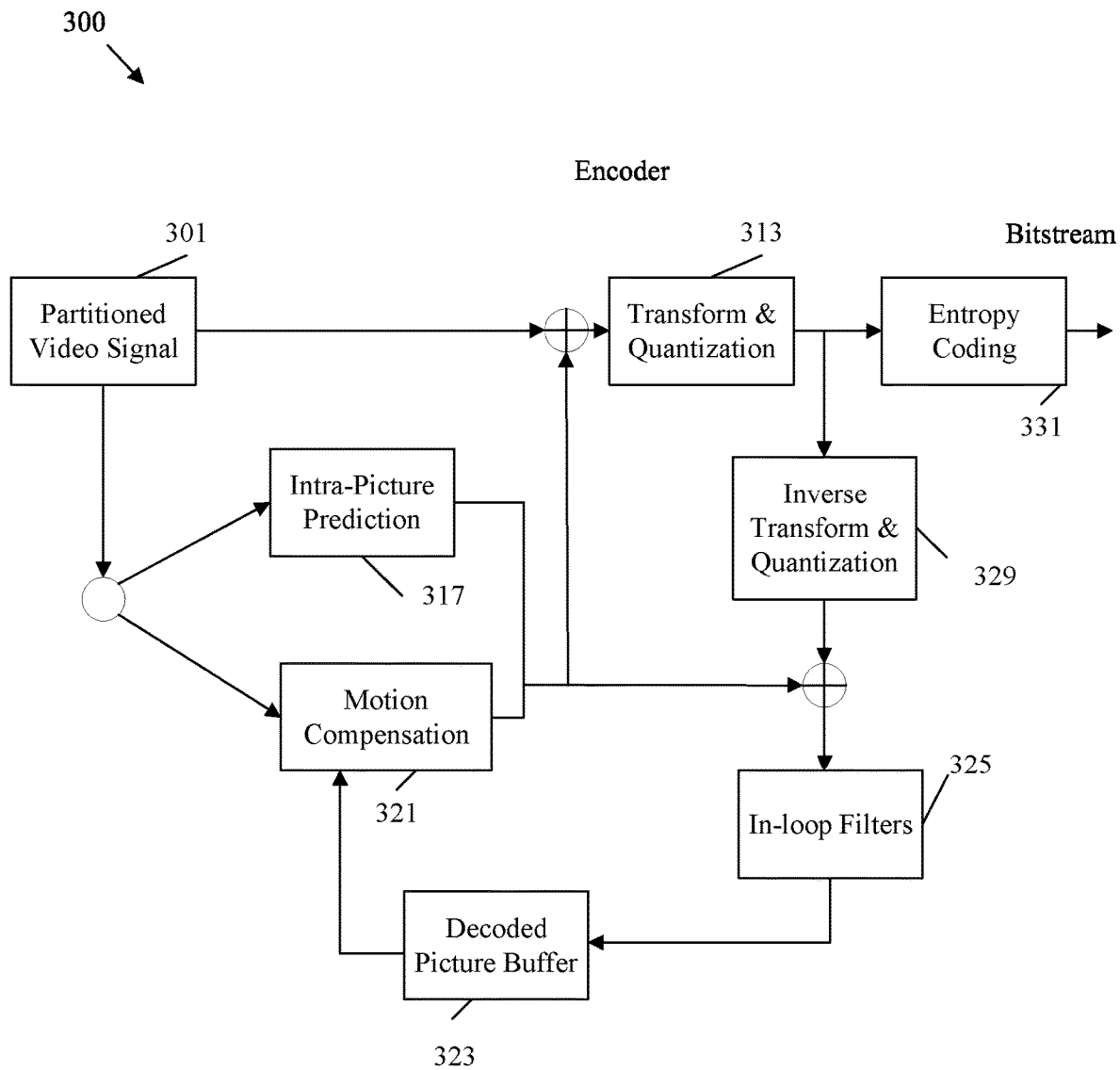
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream.

The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
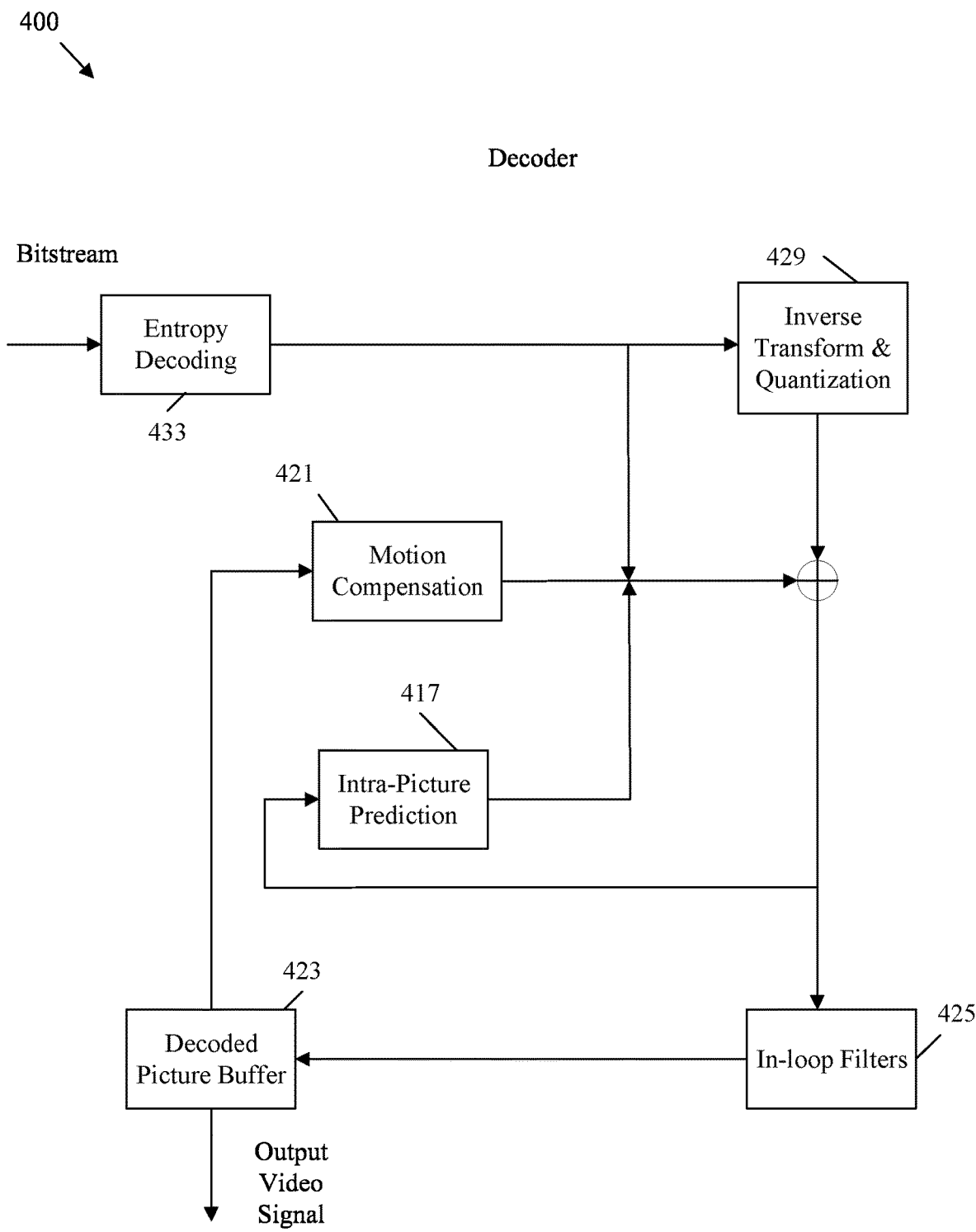
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
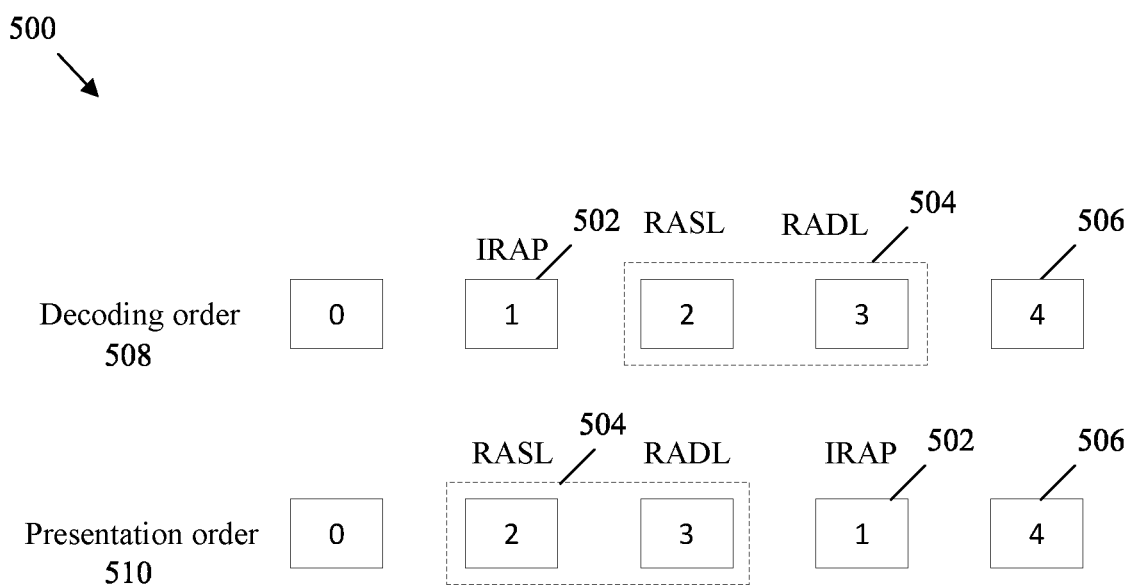
FIG. 5 is a schematic diagram illustrating an example coded video sequence with leading pictures.

FIG. 5 is a schematic diagram illustrating an example CVS 500 with leading pictures. For example, CVS 500 may be encoded by an encoder, such as codec system 200 and/or encoder 300, according to method 100. Further, the CVS 500 may be decoded by a decoder, such as codec system 200 and/or decoder 400. The CVS 500 includes pictures coded in a decoding order 508. A decoding order 508 is an order in which pictures are positioned in a bitstream. The pictures of the CVS 500 are then output in a presentation order 510. A presentation order 510 is an order in which pictures should be displayed by a decoder to cause the resulting video to display properly. For example, pictures of the CVS 500 may be generally positioned in presentation order 510. However, certain pictures may be moved into different locations to increase coding efficiency, for example by placing similar pictures in closer proximity to support inter-prediction. Moving such pictures in this manner results in the decoding order 508. In the example shown, the pictures are indexed in decoding order 508 from zero to four. In presentation order 510, the pictures at index two and index three have been moved in front of the picture at index zero.

The CVS 500 includes an IRAP picture 502. An IRAP picture 502 is a picture coded according to intra-prediction that serves as a random access point for CVS 500. Specifically, blocks of IRAP picture 502 are coded by reference to other blocks of IRAP picture 502. Since IRAP picture 502 is coded without reference to other pictures, the IRAP picture 502 can be decoded without first decoding any other pictures. Accordingly, a decoder can begin decoding the CVS 500 at IRAP picture 502. Further, IRAP picture 502 may cause the DPB to be refreshed. For example, most pictures presented after an IRAP picture 502 may not rely on pictures prior to IRAP picture 502 (e.g., picture index zero) for inter-prediction. As such, the picture buffer can be refreshed once IRAP picture 502 is decoded. This has the effect of stopping any inter-prediction related coding errors because such errors cannot propagate through the IRAP picture 502. IRAP picture 502 may include various types of pictures. For example, an IRAP picture may be coded as an instantaneous decoder refresh (IDR) or a Clean Random Access (CRA). An IDR is an intra-coded picture that begins a new CVS 500 and refreshes the picture buffer. A CRA is an intra-coded picture that acts as a random access point without beginning a new CVS 500 or refreshing the picture buffer. In this way, leading pictures 504 associated with a CRA may reference pictures prior to the CRA, while leading pictures 504 associated with an IDR may not reference pictures prior to the IDR.

The CVS 500 also includes various non-IRAP pictures. These include leading pictures 504 and trailing pictures 506. A leading picture 504 is a picture positioned after the IRAP picture 502 in decoding order 508, but positioned before to the IRAP picture 502 in presentation order 510. Trailing pictures 506 are positioned after the IRAP picture 502 in both decoding order 508 and presentation order 510. Leading pictures 504 and trailing pictures 506 are both coded according to inter-prediction in most cases. Trailing pictures 506 are coded in reference to IRAP picture 502 or pictures positioned after IRAP picture 502. Hence, trailing pictures 506 can always be decoded once IRAP picture 502 is decoded. Leading pictures 504 may include random access skipped leading (RASL) and random access decodable leading (RADL) pictures. A RASL picture is coded by reference to pictures prior to IRAP picture 502, but coded in a position after IRAP picture 502. As RASL pictures rely on previous pictures, the RASL picture cannot be decoded when the decoder begins decoding at IRAP picture 502. Accordingly, RASL pictures are skipped and not decoded when IRAP picture 502 is used as a random access point. However, RASL pictures are decoded and displayed when the decoder uses a previous IRAP picture (prior to index zero and not shown) as the random access point. RADL pictures are coded in reference to IRAP picture 502 and/or pictures following IRAP picture 502, but are positioned prior to IRAP picture 502 in presentation order. Since RADL pictures do not rely on pictures prior to IRAP picture 502, the RADL pictures can be decoded and displayed when the IRAP picture 502 is the random access point.

Figure 6:
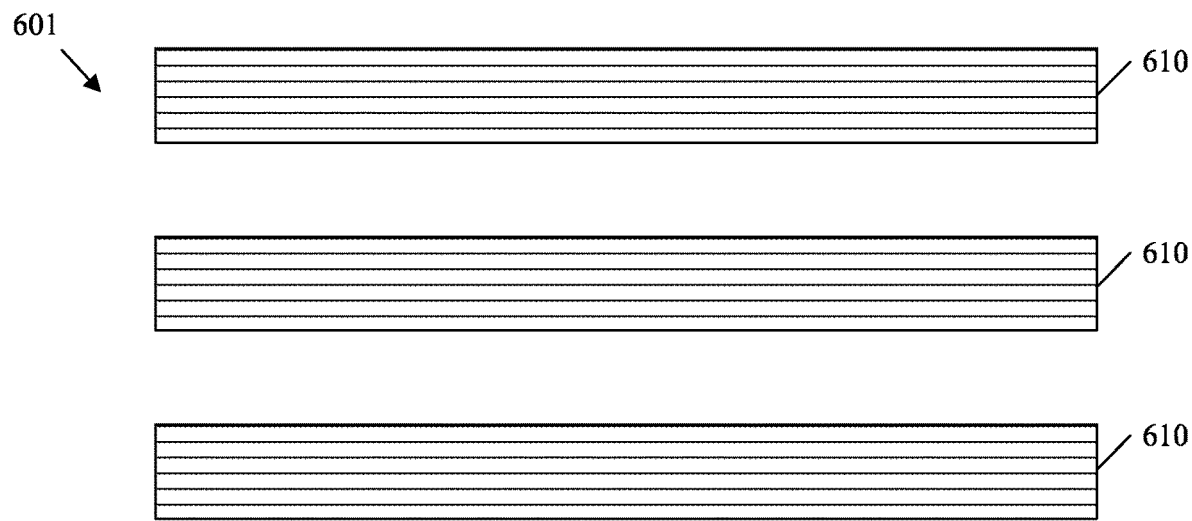
FIGS. 6A-6C are schematic diagrams collectively illustrating an example of interlaced video coding.
Figure 6:
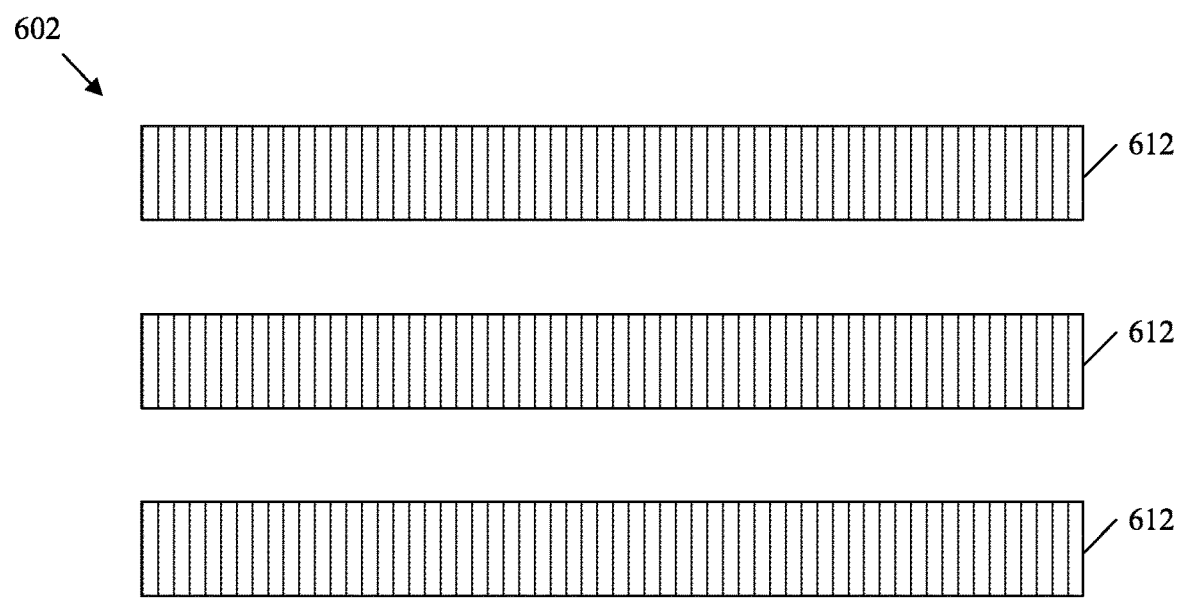
Figure 6:
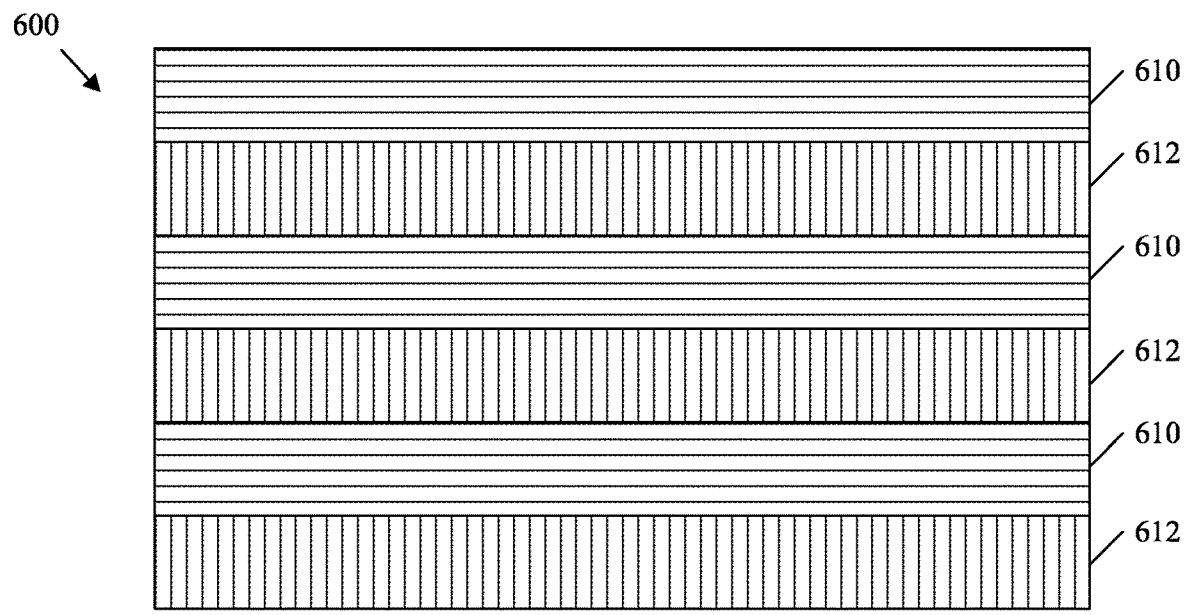

FIGS. 6A-6C are schematic diagrams collectively illustrating an example of interlaced video coding. Interlaced video coding generates an interlaced video frame 600, as shown in FIG. 6C, from a first picture 601 and a second picture 602, as shown in FIGS. 6A and 6B. For example, interlaced video coding may be employed by an encoder, such as codec system 200 and/or encoder 300, when encoding video containing an interlaced video frame 600 as part of method 100. Further, a decoder, such as codec system 200 and/or decoder 400, may decode video including an interlaced video frame 600. In addition, an interlaced video frame 600 may be encoded into a CVS, such as CVS 500, as discussed in more detail with respect to FIG. 7 below.

When performing interlaced video coding, a first field 610 is captured at a first time and encoded into a first picture 601 as shown in FIG. 6A. The first field 610 includes horizontal lines of video data. Specifically, the horizontal lines of video data in the first field 610 extend from the left boundary of the first picture 601 to the right boundary of the first picture 601. However, first field 610 omits alternating rows of video data. In an example implementation, the first field 610 contains half of the video data captured by a video capturing device at the first time.

As shown in FIG. 6B, a second field 612 is captured at a second time and encoded into a second picture 602. For example, the second time may be immediately following the first time by a value set based on a framerate set for a video. For example, in a video set to display at a frame rate of fifteen frames per second (FPS), the second time may occur one fifteenth of a second after the first time. As shown, the second field 612 includes horizontal lines of video data that are complementary to the horizontal lines of the first field 610 of the first picture 601. Specifically, the horizontal lines of video data in the second field 612 extend from the left boundary of the second picture 602 to the right boundary of the second picture 602. The second field 612 contains the horizontal lines omitted by the first field 610. In addition, the second field 612 omits the horizontal lines contained in the first field 610.

The first field 610 of the first picture 601 and the second field 612 of the second picture 602 can be combined for display at a decoder as an interlaced video frame 600 as shown in FIG. 6C. Specifically, the interlaced video frame 600 contains the first field 610 of the first picture 601 captured at the first time and the second field 612 of the second picture 602 captured at the second time. Such a combination has the visual effect of emphasizing and/or exaggerating motion. When displayed as part of video, a series of interlaced video frames 600 creates the impression that the video is encoded at an increased frame rate without the need to actually encode the additional frames. In this way, interlaced video coding that employs an interlaced video frame 600 can increase the effective frame rate of a video without an attendant increase in video data size. As such, interlaced video coding may increase the coding efficiency of an encoded video sequence.

Figure 7:
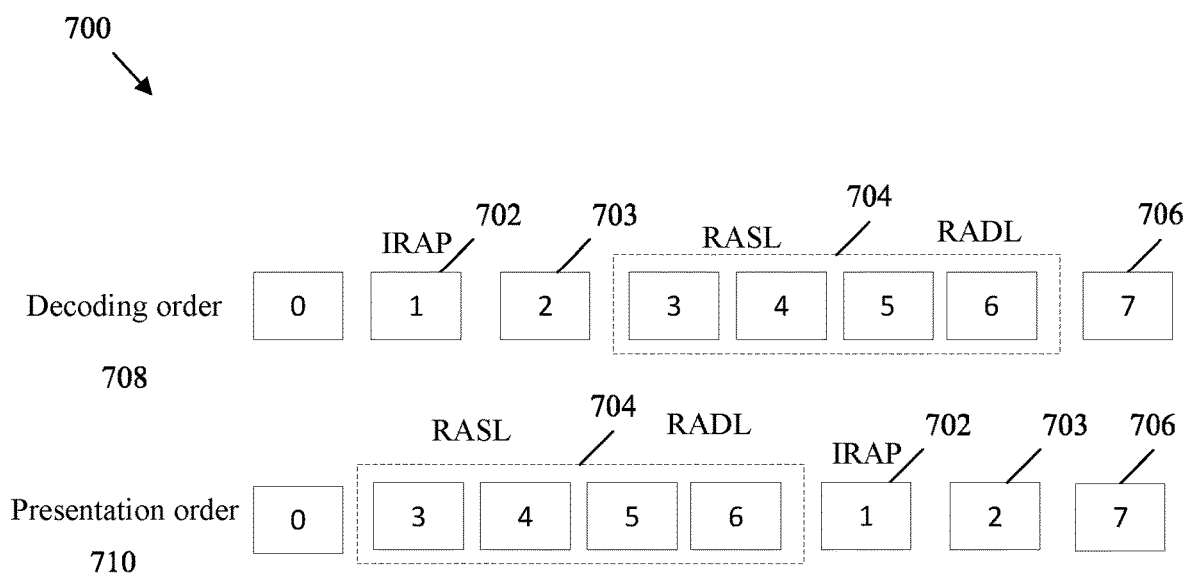
FIG. 7 is a schematic diagram illustrating an example coded video sequence employing both interlaced video coding and leading pictures.

FIG. 7 is a schematic diagram illustrating an example CVS 700 employing both interlaced video coding, for example to create an interlaced video frame 600, and leading pictures. CVS 700 is substantially similar to CVS 500, but is modified to encode pictures with fields, such as the first picture 601 and second picture 602, while retaining leading pictures. For example, CVS 700 may be encoded by an encoder, such as codec system 200 and/or encoder 300, according to method 100. Further, the CVS 700 may be decoded by a decoder, such as codec system 200 and/or decoder 400.

The CVS 700 has a decoding order 708 and a presentation order 710, which operate in a manner substantially similar to decoding order 508 and presentation order 510, respectively. The CVS 700 also contains an IRAP picture 702, leading pictures 704, and trailing pictures 706, which are similar to IRAP picture 502, leading pictures 504, and trailing pictures 506. The difference is that the IRAP picture 702, leading pictures 704, and trailing pictures 706 are all coded by employing fields in a manner substantially similar to the first field 610 and the second field 612 as described with respect to FIGS. 6A-6C. As such, each frame includes two pictures. Accordingly, the CVS 700 contains twice as many pictures as CVS 500. However, CVS 700 contains approximately the same amount of data as CVS 500 because the pictures of CVS 700 each omit half of the frame.

An issue with CVS 700 is that the IRAP picture 702 is encoded by including a first field of intra-prediction coded data. The second field of intra-prediction coded data is then included in a non-leading picture 703. The non-leading picture 703 is not an IRAP picture 702 because a decoder cannot begin decoding the CVS 700 at the non-leading picture 703. This is because doing so would omit half of the frame associated with the IRAP picture 702. This creates a problem because video coding systems employing VVC may be constrained to position the leading pictures 704 immediately following the IRAP picture 702 in decoding order 708.

The present disclosure allows CVS 700 to be employed by a VVC system. Specifically, a flag may be signaled to indicate when a single non-leading picture 703 is allowed to be positioned between the IRAP picture 702 and the leading pictures 704. The video system may still be constrained to prevent non-leading pictures 703 and/or trailing pictures 706 from being positioned between the leading pictures 704. Accordingly, the flag may indicate that the decoding order 708 includes an IRAP picture 702, a single non-leading picture 703, any leading pictures 704 (e.g., leading pictures 704 are optional and may be omitted in some examples), and then one or more trailing pictures 706. As such, the flag can indicate to the decoder whether to expect a CVS 500 or a CVS 700. In some examples, a field_seq_flag in an SPS can be employed for the purpose as discussed below.

Figure 8:
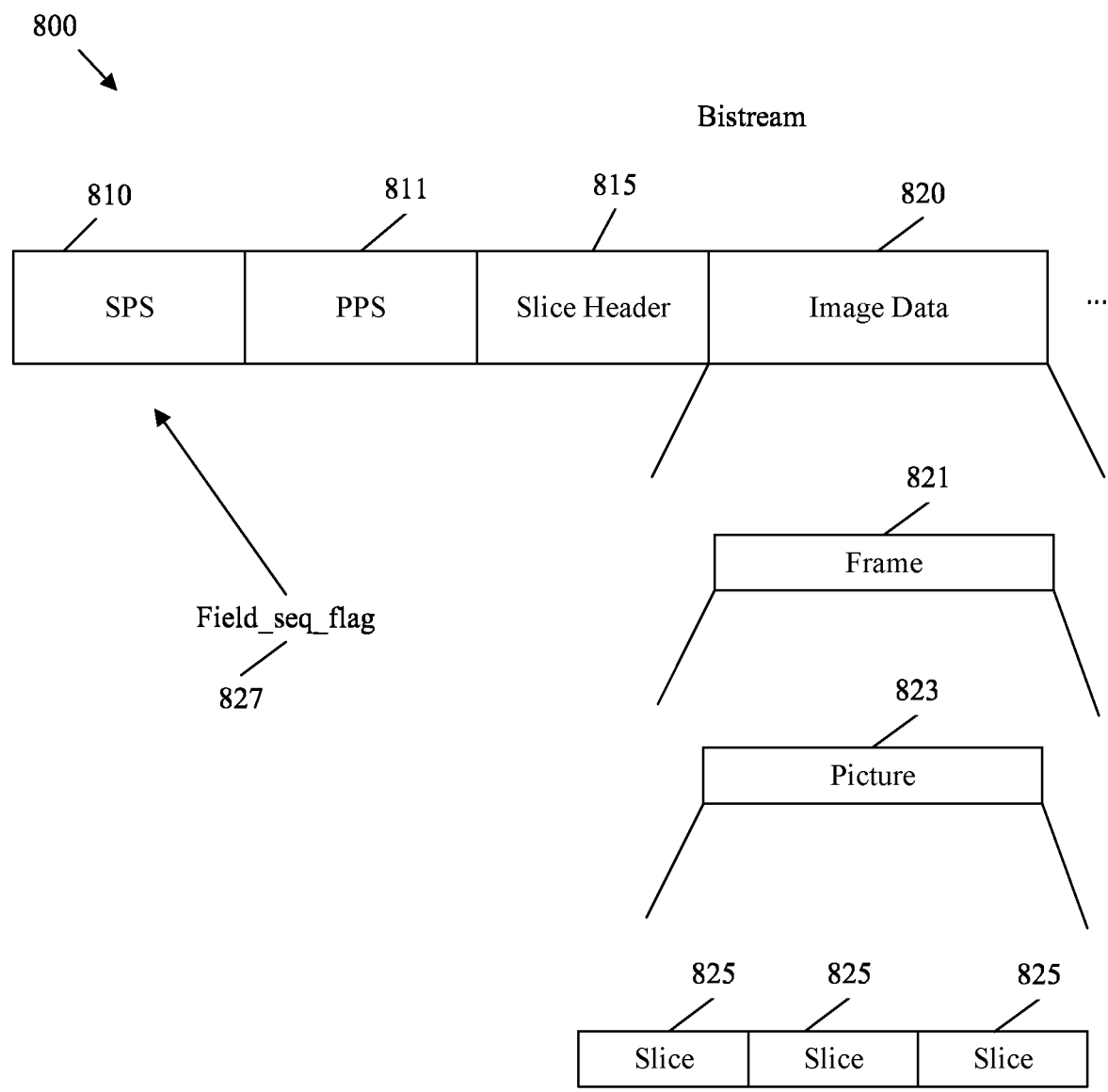
FIG. 8 is a schematic diagram illustrating an example bitstream configured to contain both interlaced video coding and leading pictures.

FIG. 8 is a schematic diagram illustrating an example bitstream 800 configured to contain both interlaced video coding and leading pictures. For example, the bitstream 800 can be generated by a codec system 200 and/or an encoder 300 for decoding by a codec system 200 and/or a decoder 400 according to method 100. Further, the bitstream 800 may include a CVS 500 and/or 700. As such, the bitstream 800 may include a first picture 601 and a second picture 602 that can be combined to create an interlaced video frame 600. Further, the bitstream 800 may include leading pictures 504 and/or 704.

The bitstream 800 includes an SPS 810, a plurality of picture parameter sets (PPSs) 811, a plurality of slice headers 815, and image data 820. An SPS 810 contains sequence data common to all the pictures in the coded video sequence contained in the bitstream 800. Such data can include picture sizing, bit depth, coding tool parameters, bit rate restrictions, etc. The PPS 811 contains parameters that apply to an entire picture. Hence, each picture in the video sequence may refer to a PPS 811. It should be noted that, while each picture refers to a PPS 811, a single PPS 811 can contain data for multiple pictures in some examples. For example, multiple similar pictures may be coded according to similar parameters. In such a case, a single PPS 811 may contain data for such similar pictures. The PPS 811 can indicate coding tools available for slices in corresponding pictures, quantization parameters, offsets, etc. The slice header 815 contains parameters that are specific to each slice in a picture. Hence, there may be one slice header 815 per slice in the video sequence. The slice header 815 may contain slice type information, picture order counts (POCs), reference picture lists, prediction weights, tile entry points, deblocking parameters, etc. It should be noted that a slice header 815 may also be referred to as a tile group header in some contexts.

The image data 820 contains video data encoded according to inter-prediction and/or intra-prediction as well as corresponding transformed and quantized residual data. For example, a video sequence includes a plurality of frames 821. A frame 821 is a complete image that is intended for complete or partial display to a user at a corresponding instant in a video sequence. A frame 821 may include one or more pictures 823. In most contexts, a frame 821 includes a single picture 823. In such a case, a picture 823 an image/frame 821 contained in a single access unit (AU). However, in an interlaced video context, a picture 823 is a field of horizontal lines, such a first field 610 or a second field 612, contained in an AU. As such, a frame 821 may be generated from two pictures 823 when employing interlaced video coding. A picture 823 contains one or more slices 825. A slice 825 may be defined as an integer number of complete tiles or an integer number of consecutive complete coding tree unit (CTU) rows (e.g., within a tile) of a picture 823 that are exclusively contained in a single network abstraction layer (NAL) unit. Hence, the slices 725 are further divided into CTUs and/or coding tree blocks (CTBs). The CTUs/CTBs are further divided into coding blocks based on coding trees. The coding blocks can then be encoded/decoded according to prediction mechanisms.

The bitstream 800 may include a field_seq_flag 827. The field_seq_flag 827 may be set to a first value when any leading pictures associated with an IRAP picture precede, in coding order, all non-leading pictures associated with the IRAP picture as shown in CVS 500. The flag may be set to a second value when a non-leading picture precedes, in coding order, an initial leading picture associated with the IRAP picture and no leading pictures are positioned between the initial leading picture and a final leading picture in decoding order as shown in CVS 700. In this case, the IRAP picture includes a first field of a frame, and the non-leading picture preceding the initial leading picture includes a second field of the frame. In the example shown, the field_seq_flag 827 may be contained in the SPS 810. As a specific example, the field_seq_flag 827 may be set to one when indicating that a coded video sequence includes pictures 823 that represent fields of frame 821 or set to zero when indicating that the coded video sequence includes pictures 823 that each represent a complete frame 821. Accordingly, a decoder can read the field_seq_flag 827 to determine when decoding the IRAP picture and the one or more non-leading pictures should include interlacing the first field from the IRAP picture and the second field from the non-leading picture preceding the initial leading picture to create a single frame. As such, the field_seq_flag 827 allows interlaced video coding to be employed in conjunction with leading pictures. As such, employing the field_seq_flag 827 increases the functionality of an encoder and/or decoder. Further, employing the field_seq_flag 827 may increase the coding efficiency of a bitstream 800 by allowing an effective frame rate to be increased without significantly increasing the amount of data needed to code a video sequence. As such, employing the field_seq_flag 827 may reduce usage of processor, memory, and/or network transmission resources at an encoder and/or decoder.

The preceding information is now described in more detail herein below. IRAP pictures provide various beneficial functionalities, but create a penalty to compression efficiency. The presence of an IRAP picture may cause surge in bit-rate. This penalty to the compression efficiency may be caused for multiple reasons. For example, an IRAP picture is an intra-predicted picture, and hence the IRAP picture requires more bits to represent when compared to inter-predicted pictures. Further, the presence of an IRAP picture may break temporal prediction. This is because a decoder may refresh decoding process upon receiving an IRAP picture, which results in the removal of previous reference pictures in the DPB. This may cause the coding of pictures that follow the IRAP picture in decoding order to be less efficient because such have access to fewer reference pictures when performing inter-prediction coding.

Among the picture types that are used as IRAP pictures, IDR pictures may employ different signaling and derivation when compared to other picture types. Some of the differences are as follows. When signaling and/or deriving a POC value of an IDR picture, the most significant bit (MSB) part of the POC may not be derived from a previous key picture. Instead, the MSB of the POC may be set to be equal to zero. Further, a slice header of an IDR picture may not contain information to assist a decoder in performing reference picture management. For other picture types, such as CRA, trailing, and temporal sub-layer access (TSA), information such as a reference picture set (RPS) or reference picture lists may be contained in a slice header and employed for the reference pictures marking process. The picture marking process is employed to determine the status of reference pictures in the DPB as either used for reference or unused for reference. However, for IDR pictures, such information may not be signaled because the presence of IDR indicates that the decoding process shall simply mark all reference pictures in the DPB as unused for reference.

In addition, leading pictures may be associated with and IRAP. Leading pictures are pictures that follow its associated IRAP picture in decoding order but precede the IRAP picture in output order. Depending on the coding configuration and picture referencing structure, leading pictures may be further identified into two types. The first type of pictures, known as RASL pictures, are leading pictures that may not be decoded correctly when decoding process starts at an associated IRAP picture. This may happen because these leading pictures are coded with reference to pictures that precede the IRAP picture in decoding order. The second type of pictures, known as RADL pictures, are the leading pictures that shall be decoded correctly even when a decoding process starts at an associated IRAP picture. This is possible because these leading pictures are coded without referencing, directly or indirectly, any pictures that precede the IRAP picture in decoding order. In some video coding systems, RASL pictures associated with an IRAP pictures are constrained to precede the RADL pictures associated with the same IRAP picture in output order.

IRAP pictures and leading pictures may be given different NAL unit types so that they can be easily identified by system level applications. For example, a video splicer may understand coded picture types without having to consider detailed syntax elements in the coded bitstream. For example, the splice may need to identify IRAP pictures from non-IRAP pictures and to identify leading pictures, including determining RASL and RADL pictures, from trailing pictures. Trailing pictures are those pictures that are associated with an IRAP picture and follow the IRAP picture in output order. A current picture is associated with an IRAP picture when the current picture follows the IRAP picture in decoding order and precedes any other IRAP picture in decoding order. As such, providing IRAP and leading pictures with corresponding NAL unit type support the functionality of such applications.

In some video coding systems, NAL unit types for IRAP and leading pictures may include the following. A broken link access (BLA) with leading picture (BLA_W_LP) is a NAL unit for a BLA picture that may be followed by one or more leading pictures in decoding order. A BLA with RADL (BLA_W_RADL) is a NAL unit for a BLA picture that may be followed by one or more RADL pictures but no RASL picture in decoding order. A BLA with no leading picture (BLA_N_LP) is a NAL unit of a BLA picture that is not followed by leading picture in decoding order. An IDR with RADL (IDR_W_RADL) is a NAL unit of an IDR picture that may be followed by one or more RADL pictures, but no RASL picture, in decoding order. An IDR with no leading picture (IDR_N_LP) is a NAL unit of an IDR picture that is not followed by leading picture in decoding order. A CRA is a NAL unit of a CRA picture that may be followed by leading pictures including RASL and/or RADL pictures. RADL is a NAL unit of a RADL picture. RASL is a NAL unit of a RASL picture.

Other video coding systems may employ the following NAL unit types for IRAP and leading pictures. IDR_W_RADL is a NAL unit of an IDR picture that may be followed by one or more RADL pictures, but no RASL picture, in decoding order. IDR_N_LP is a NAL unit of an IDR picture that is not followed by leading picture in decoding order. CRA is a NAL unit of a CRA picture that may be followed by leading pictures, such as RASL and/or RADL pictures. RADL is a NAL unit of a RADL picture. RASL is a NAL unit of a RASL picture.

For bitstream conformance, some constraints may be applied to leading pictures, for example in HEVC and/or VVC systems. Such constraints are as follows. Each picture, other than the first picture in the bitstream in decoding order, may be considered to be associated with the previous IRAP picture in decoding order. When a picture is a leading picture of an IRAP picture, the picture shall be a RADL or RASL picture. When a picture is a trailing picture of an IRAP picture, the picture shall not be a RADL or RASL picture. When a picture is a leading picture of an IRAP picture, the picture shall precede, in decoding order, all trailing pictures that are associated with the same IRAP picture. No RASL pictures shall be associated with an IDR picture. No RADL pictures shall be associated with an IDR picture having nal_unit_type equal to IDR_N_LP. It should be noted that a random access may be performed at the position of an IRAP access unit by discarding all access units before the IRAP access unit. Such random access may result in correctly decoding the IRAP picture and all the subsequent non-RASL pictures in decoding order. Such random access may be performed, provided each parameter set is available, either in the bitstream or by external means such as a user input, when such a parameter set is to be activated. Further, any picture that precedes an IRAP picture in decoding order shall precede the IRAP picture in output order and shall precede any RADL picture associated with the IRAP picture in output order. Any RASL picture associated with a CRA picture shall precede any RADL picture associated with the CRA picture in output order. Any RASL picture associated with a CRA picture shall follow, in output order, any IRAP picture that precedes the CRA picture in decoding order.

Accordingly, bitstream conformance constraints related to leading pictures as described above may conflict with interlaced video coding mechanisms. The conflict is as follows. When interlaced coding is used, the two fields of an IRAP picture are not both marked as IRAP pictures. Instead only the first field is marked as an IRAP picture and the second field is marked as a trailing picture. The interlaced trailing picture, which contains the second field of the picture, should immediately follow the interlaced IRAP picture in decoding order. This is because the interlaced IRAP picture and the interlaced trailing picture make a complete frame. If leading picture(s) follow the IRAP picture in decoding order, then the constraint stating that when a picture is a leading picture of an IRAP picture, the picture shall precede, in decoding order, all trailing pictures that are associated with the same IRAP picture is violated. The preceding constraint cannot simply be removed because the constraint may help an external entity, such as a video splicer, to efficiently determine whether there are leading picture associated with an IRAP and whether all the leading pictures have been considered. Such an external entity may operate as follows. Starting from an IRAP picture, if the picture that immediately follows the IRAP picture is a trailing picture, the external entity can determine that there are no leading pictures associated with the IRAP picture. Hence, to search for all leading pictures associated with an IRAP picture, the external entity may find the first trailing picture that follows the IRAP picture in decoding order based on this constraint. Without the above constraint, an external entity may be required to search until the next IRAP picture in order to find all leading pictures associated with an IRAP picture.

In general, the present disclosure describes methods for handling leading pictures associated with IRAP pictures. More specifically, this disclosure describes methods for efficiently searching and identifying leading pictures associated with an IRAP picture while supporting efficient coding of interlaced video content. The description of the techniques is described based on the VVC standard by the JVET of ITU-T and ISO/IEC. However, the techniques may also apply to other video codec specifications.

In order to solve the problems listed above, the present disclosure includes the following aspects, which can be applied individually or in combination. For example, leading pictures associated with an IRAP picture may be positioned consecutively in decoding order with no non-leading picture(s) in between. Further, the following constraint is applied for bitstream conformance of IRAP and leading pictures. Let picA and picB be the first and the last leading pictures associated with an IRAP picture, respectively. In such a case, there shall be no picture that is not a leading picture that follows picA and precedes picB in decoding order, respectively.

The following constraints can also be applied. If a field_seq_flag is set equal to zero and the current picture is a leading picture associated with an IRAP picture, the current picture shall precede, in decoding order, all non-leading pictures that are associated with the same IRAP picture. Otherwise, if the field_seq_flag is set equal to one, let picA and picB be the first and the last leading pictures, in decoding order, associated with an IRAP picture, respectively. In such a case, there shall be at most one non-leading picture preceding picA in decoding order, and there shall be no non-leading picture that succeeds picA in decoding order and precedes picB in decoding order.

The following constraints can also be applied. If the general_frame_only_constraint_flag is equal to one and the current picture is a leading picture associated with an IRAP picture, the current picture shall precede, in decoding order, all non-leading pictures that are associated with the same IRAP picture. Otherwise, if the general_frame_only_constraint_flag is equal to zero, let picA and picB be the first and the last leading pictures, in decoding order, associated with an IRAP picture, respectively. In such a case, there shall be at most one non-leading picture preceding picA in decoding order, and there shall be no non-leading picture that succeeds picA in decoding order and precedes picB in decoding order.

In an example, a NAL unit type of an IRAP picture provides sufficient information to determine whether leading picture(s) associated with the IRAP picture is/are present. For this the following method may be used. NAL unit type CRA_NUT may be replaced with CRA_W_LP in order to indicate that leading picture(s) are associated with the CRA picture and/or CRA_N_LP to indicate no leading pictures are associated with the CRA picture. In another example, NAL unit types IDR_W_RADL, IDR_N_LP, and CRA_NUT may be replaced with IRAP_W_LP to indicate that leading pictures are associated with the IRAP picture and IRAP_N_LP to indicate that leading pictures are not associated with the IRAP picture.

In an example, the following may apply to CRA_W_LP, CRA_N_LP, IDR_W_RADL, and IDR_N_LP. An IDR picture having a NalUnitType equal to IDR_N_LP is not associated with any leading pictures present in the bitstream. An IDR picture having NalUnitType equal to IDR_W_RADL is not associated with RASL pictures present in the bitstream, but has may be associated with RADL pictures in the bitstream. A CRA picture having a NalUnitType equal to CRA_N_LP is not associated with leading pictures present in the bitstream. A CRA picture having a NalUnitType equal to CRA_W_LP may be associated with leading pictures in the bitstream.

In an example, the mapping of the above NAL unit types to Stream Access Point (SAP) types are as follows. IDR_N_LP and CRA_N_LP are associated with SAP type 1, IDR_W_RADL is associated with SAP type 2, and CRA_W_LP is associated with SAP type 3.

In an example, the following may apply to IRAP_W_LP and IRAP_N_LP. An IRAP picture having NalUnitType equal to IRAP_N_LP is not have associated with leading pictures present in the bitstream. An IRAP picture having NalUnitType equal to IRAP_W_LP may be associated with leading pictures in the bitstream.

In an example, the mapping of the above NAL unit types to SAP types are as follows. IRAP_N_LP is associated with SAP type 1 and IRAP_W_LP is associated with SAP type 3.

In an example, to determine whether leading pictures associated with an IRAP are present or not, a device may check the NAL unit type of the IRAP picture. When an IRAP picture may be associated with one or more leading pictures associated, the following step may be used to find all leading pictures associated with the IRAP picture. The device may start from the IRAP picture. If the picture that immediately follows the IRAP picture in decoding order is a non-leading picture, the picture may be ignored. Note that the presence of such non-leading picture immediately after an IRAP picture may indicate that the bitstream is an interlaced video coding bitstream. The next picture shall be a leading picture. The process may continue checking the next picture until the first non-leading picture is encountered.

Figure 9:
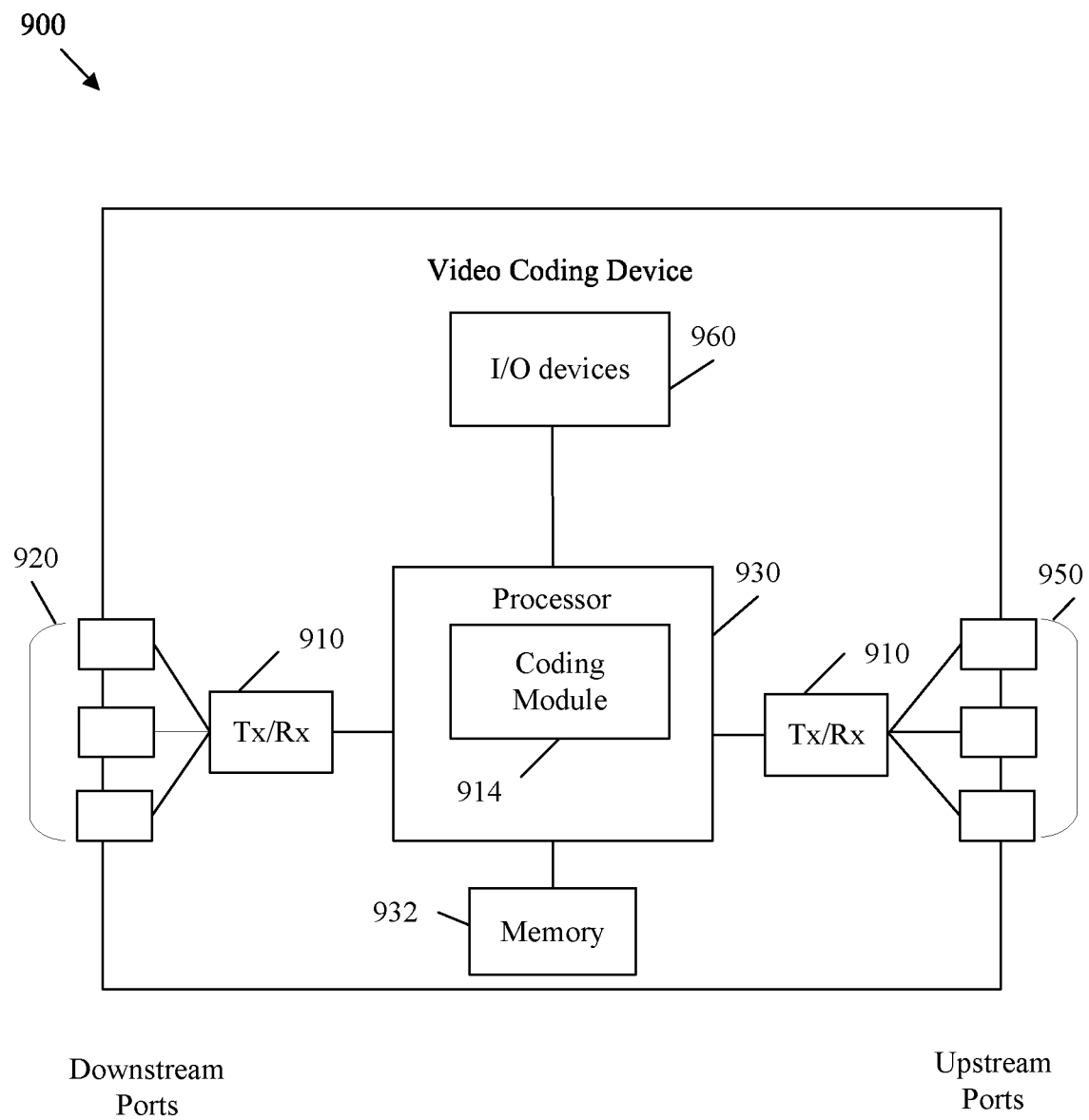
FIG. 9 is a schematic diagram of an example video coding device.

FIG. 9 is a schematic diagram of an example video coding device 900. The video coding device 900 is suitable for implementing the disclosed examples/embodiments as described herein. The video coding device 900 comprises downstream ports 920, upstream ports 950, and/or transceiver units (Tx/Rx) 910, including transmitters and/or receivers for communicating data upstream and/or downstream over a network. The video coding device 900 also includes a processor 930 including a logic unit and/or central processing unit (CPU) to process the data and a memory 932 for storing the data. The video coding device 900 may also comprise electrical, optical-to-electrical (OE) components, electrical-to-optical (EO) components, and/or wireless communication components coupled to the upstream ports 950 and/or downstream ports 920 for communication of data via electrical, optical, or wireless communication networks. The video coding device 900 may also include input and/or output (I/O) devices 960 for communicating data to and from a user. The I/O devices 960 may include output devices such as a display for displaying video data, speakers for outputting audio data, etc. The I/O devices 960 may also include input devices, such as a keyboard, mouse, trackball, etc., and/or corresponding interfaces for interacting with such output devices.

The processor 930 is implemented by hardware and software. The processor 930 may be implemented as one or more CPU chips, cores (e.g., as a multi-core processor), field-programmable gate arrays (FPGAs), application specific integrated circuits (ASICs), and digital signal processors (DSPs). The processor 930 is in communication with the downstream ports 920, Tx/Rx 910, upstream ports 950, and memory 932. The processor 930 comprises a coding module 914. The coding module 914 implements the disclosed embodiments described herein, such as methods 100, 1000, and 1100, which may employ a CVS 500, an interlaced video frame 600, a CVS 700, and/or a bitstream 800. The coding module 914 may also implement any other method/mechanism described herein. Further, the coding module 914 may implement a codec system 200, an encoder 300, and/or a decoder 400. For example, the coding module 914 can set a flag in an SPS to indicate when a non-leading picture is positioned between an IRAP picture and a set of leading pictures. Hence, coding module 914 causes the video coding device 900 to provide additional functionality and/or coding efficiency when coding video data. As such, the coding module 914 improves the functionality of the video coding device 900 as well as addresses problems that are specific to the video coding arts. Further, the coding module 914 effects a transformation of the video coding device 900 to a different state. Alternatively, the coding module 914 can be implemented as instructions stored in the memory 932 and executed by the processor 930 (e.g., as a computer program product stored on a non-transitory medium).

The memory 932 comprises one or more memory types such as disks, tape drives, solid-state drives, read only memory (ROM), random access memory (RAM), flash memory, ternary content-addressable memory (TCAM), static random-access memory (SRAM), etc. The memory 932 may be used as an over-flow data storage device, to store programs when such programs are selected for execution, and to store instructions and data that are read during program execution.

FIG. 10 is a flowchart of an example method 1000 of encoding a video sequence, such as CVS 500 and/or 700, with interlaced video coding, such as interlaced video frame 600, and leading pictures into a bitstream, such as bitstream 800. Method 1000 may be employed by an encoder, such as a codec system 200, an encoder 300, and/or a video coding device 900 when performing method 100.

Method 1000 may begin when an encoder receives a video sequence including a plurality of pictures and determines to encode that video sequence into a bitstream, for example based on user input. At step 1001, the encoder determines a coding order for a video sequence. The video sequence comprises a plurality of pictures including an IRAP picture and one or more non-leading pictures associated with the IRAP picture. The video sequence may also optionally include one or more (e.g., a group) of leading pictures.

At step 1003, the encoder can encode a flag into a bitstream. The flag can be set to a first value when any leading pictures associated with the IRAP picture precede, in coding order, all non-leading pictures associated with the IRAP picture as in CVS 500. This indicates that the video sequence does not contain interlaced video. The flag may also be set to a second value when a non-leading picture precedes, in coding order, an initial leading picture associated with the IRAP picture as in CVS 700. When the flag is set to the second value the bitstream may also be constrained such that no leading pictures are positioned between the initial leading picture and a final leading picture in coding order. This may indicate that the video sequence does contain interlaced video. As a specific example, the encoder can encode an SPS into the bitstream, and the flag can be encoded into the SPS. In some examples, the flag is a field_seq_flag. For example, the field_seq_flag can be set to one when indicating that a coded video sequence includes pictures that represent fields. Further, the field_seq_flag can be set to zero when indicating that the coded video sequence includes pictures that represent frames. Accordingly, the flag can be set to indicate that interlaced video coding is employed in the bitstream. As such, the flag can be set when the IRAP picture includes a first field of a frame, and a non-leading picture preceding the initial leading picture includes a second field of the frame. For example, the first field from the IRAP picture and the second field from the non-leading picture preceding the initial leading picture may include alternating lines of video data that represent a single interlaced video frame as shown with respect to FIGS. 6A-6C.

At step 1005, the encoder can encode the IRAP picture, any leading pictures associated with the IRAP picture, and the one or more non-leading pictures associated with the IRAP picture into the bitstream in coding order. The encoder can then store the bitstream for communication toward a decoder at step 1007.

Figure 11:
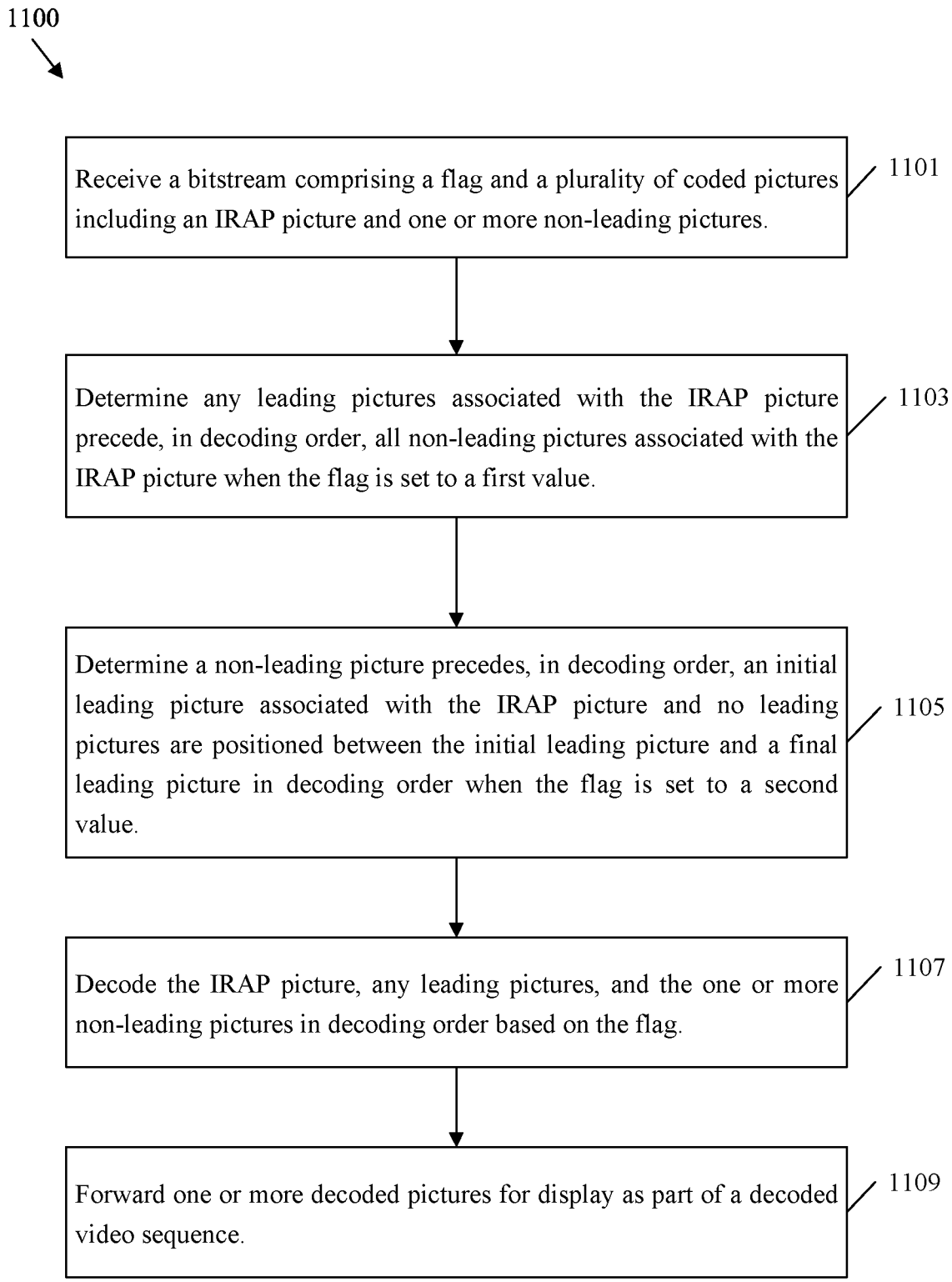
FIG. 11 is a flowchart of an example method of decoding a video sequence with interlaced video coding and leading pictures from a bitstream.

FIG. 11 is a flowchart of an example method 1100 of decoding a video sequence, such as CVS 500 and/or 700, with interlaced video coding, such as interlaced video frame 600, and leading pictures from a bitstream, such as bitstream 800. Method 1100 may be employed by a decoder, such as a codec system 200, a decoder 400, and/or a video coding device 900 when performing method 100.

Method 1100 may begin when a decoder begins receiving a bitstream of coded data representing a video sequence, for example as a result of method 1000. At step 1101, the decoder receives a bitstream comprising a flag and a plurality of coded pictures including an IRAP picture and one or more non-leading pictures associated with the IRAP picture. The video sequence may also optionally include one or more (e.g., a group) of leading pictures.

At step 1103, the decoder can determine that any leading pictures associated with the IRAP picture precede, in decoding order, all non-leading pictures associated with the IRAP picture when the flag is set to a first value as shown in CVS 500. This indicates that the video sequence does not contain interlaced video. At step 1105, the decoder can determine that a non-leading picture precedes, in decoding order, an initial leading picture associated with the IRAP picture when the flag is set to a second value as shown in CVS 700. When the flag is set to the second value the decoder may further determine that no leading pictures are positioned between the initial leading picture and a final leading picture in coding order. This may indicate that the video sequence does contain interlaced video. As a specific example, the bitstream may include an SPS, and the flag can be obtained from the SPS. In some examples, the flag is a field_seq_flag. For example, the field_seq_flag can be set to one when indicating that a coded video sequence includes pictures that represent fields. Further, the field_seq_flag can be set to zero when indicating that the coded video sequence includes pictures that represent frames. Accordingly, the flag can be set to indicate that interlaced video coding is employed in the bitstream. As such, the flag can be set when the IRAP picture includes a first field of a frame, and a non-leading picture preceding the initial leading picture includes a second field of the frame.

At step 1107, the decoder decodes the IRAP picture, any leading pictures associated with the IRAP picture, and the one or more non-leading pictures associated with the IRAP picture in decoding order based on the flag. For example, decoding the IRAP picture, leading pictures (if any), and the one or more non-leading pictures may include interlacing the first field from the IRAP picture and the second field from the non-leading picture preceding the initial leading picture to create a single frame as shown with respect to FIGS. 6A-6C. At step 1109, the decoder may forward one or more decoded pictures as a result of step 1107 for display as part of a decoded video sequence.

Figure 12:
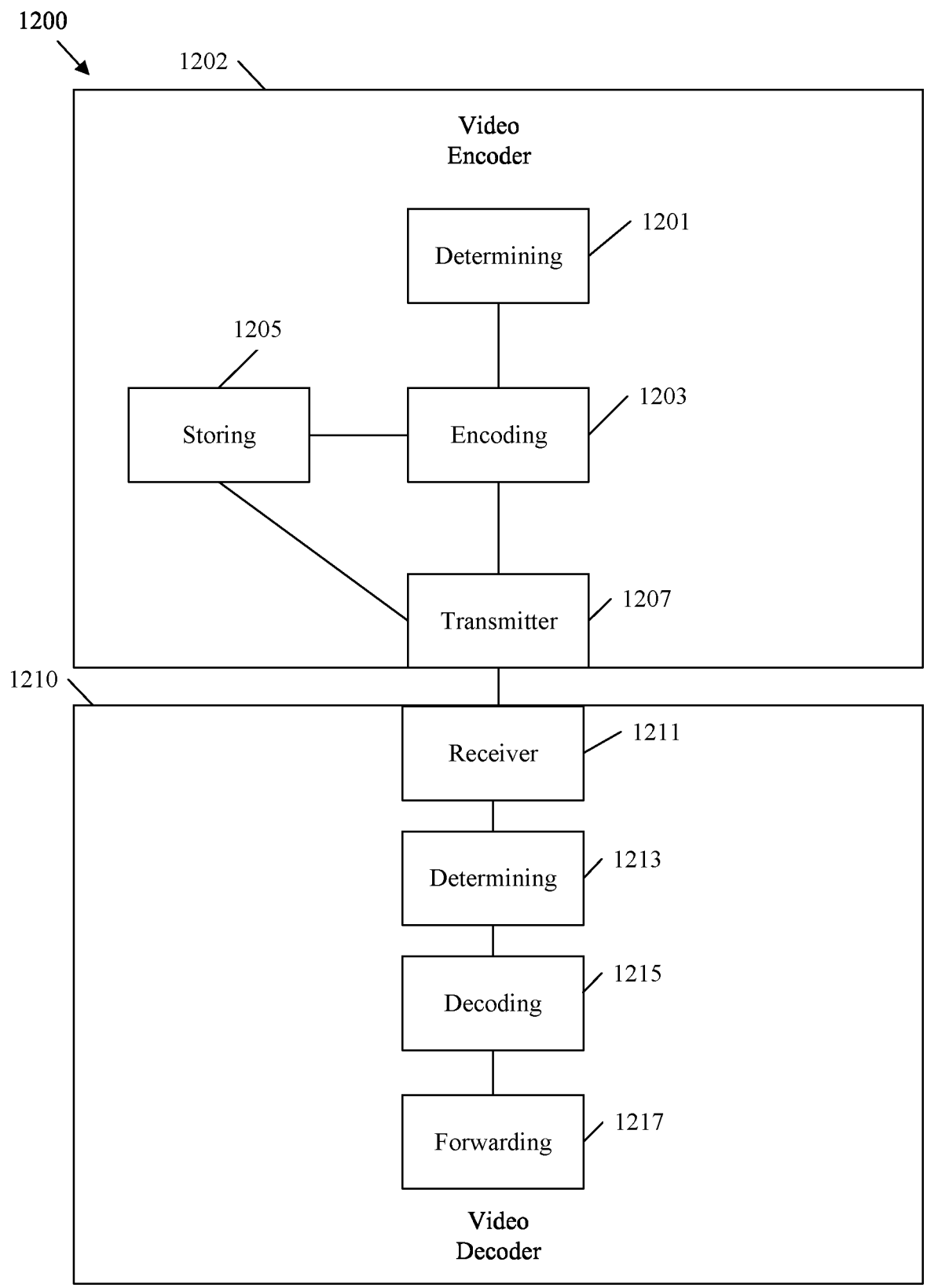
FIG. 12 is a schematic diagram of an example system for coding a video sequence with interlaced video coding and leading pictures into a bitstream.

FIG. 12 is a schematic diagram of an example system 1200 for coding a video sequence, such as CVS 500 and/or CVS 700, with interlaced video coding, such as interlaced video frame 600, and leading pictures into a bitstream, such as bitstream 800. System 1200 may be implemented by an encoder and a decoder such as a codec system 200, an encoder 300, a decoder 400, and/or a video coding device 900. Further, system 1200 may be employed when implementing method 100, 1000, and/or 1100.

The system 1200 includes a video encoder 1202. The video encoder 1202 comprises a determining module 1201 for determining a coding order for a video sequence comprising plurality of pictures including an IRAP picture and one or more non-leading pictures associated with the IRAP picture. The video encoder 1202 further comprises an encoding module 1203 for encoding a flag into a bitstream, wherein the flag is set to a first value when any leading pictures associated with the IRAP picture precede, in coding order, all non-leading pictures associated with the IRAP picture, and wherein the flag is set to a second value when a non-leading picture precedes, in coding order, an initial leading picture associated with the IRAP picture. The an encoding module 1203 is further for encoding the IRAP picture, any leading pictures associated with the IRAP picture, and the one or more non-leading pictures associated with the RAP picture into the bitstream in coding order. The video encoder 1202 further comprises a storing module 1205 for storing the bitstream for communication toward a decoder. The video encoder 1202 further comprises a transmitting module 1207 for transmitting the bitstream toward a video decoder 1210. The video encoder 1202 may be further configured to perform any of the steps of method 1000.

The system 1200 also includes a video decoder 1210. The video decoder 1210 comprises a receiving module 1211 for receiving a bitstream comprising a flag and a plurality of coded pictures including an IRAP picture and one or more non-leading pictures associated with the IRAP picture. The video decoder 1210 further comprises a determining module 1213 for determining any leading pictures associated with the IRAP picture precede, in decoding order, all non-leading pictures associated with the IRAP picture when the flag is set to a first value. The determining module 1213 is further for determining a non-leading picture precedes, in decoding order, an initial leading picture associated with the IRAP picture when the flag is set to a second value. The video decoder 1210 further comprises a decoding module 1215 for decoding the IRAP picture, any leading pictures associated with the IRAP picture, and the one or more non-leading pictures associated with the IRAP picture in decoding order based on the flag. The video decoder 1210 further comprises a forwarding module 1217 for forwarding one or more decoded pictures for display as part of a decoded video sequence. The video decoder 1210 may be further configured to perform any of the steps of method 1100.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method for storing an encoded bitstream of video data, wherein the method comprises:
   receiving the bitstream, wherein the bitstream comprises a sequential field flag (field_seq_flag) and a plurality of coded pictures including an intra random access point (IRAP) picture and one or more non-leading pictures associated with the IRAP picture, wherein any leading pictures associated with the IRAP picture precede, in decoding order, all non-leading pictures associated with the IRAP picture when the flag is set to zero, wherein at most one non-leading picture precedes, in decoding order, an initial leading picture associated with the IRAP picture, wherein no non-leading pictures are positioned between the initial leading picture and a final leading picture in decoding order when the flag is set to one, wherein the field_seq_flag is set to one when a coded video sequence includes pictures that represent fields, and wherein the field_seq_flag is set to zero when the coded video sequence includes pictures that represent frames; and
   storing the bitstream into a storage medium.

2. The method of claim 1, wherein the bitstream includes a sequence parameter set (SPS), and wherein the flag is obtained from the SPS.

3. The method of claim 1, wherein the IRAP picture includes a first field of a frame, and wherein the non-leading picture preceding the initial leading picture includes a second field of the frame.

4. A method for transmitting an encoded bitstream of video data, wherein the method comprises:
   obtaining a bitstream from a storage medium, wherein the bitstream comprises a sequential field flag (field_seq_flag) and a plurality of coded pictures including an intra random access point (IRAP) picture and one or more non-leading pictures associated with the IRAP picture, wherein any leading pictures associated with the IRAP picture precede, in decoding order, all non-leading pictures associated with the IRAP picture when the flag is set to zero, wherein at most one non-leading picture precedes, in decoding order, an initial leading picture associated with the IRAP picture, wherein no non-leading pictures are positioned between the initial leading picture and a final leading picture in decoding order when the flag is set to one, wherein the field_seq_flag is set to one when a coded video sequence includes pictures that represent fields, wherein the field_seq_flag is set to zero when the coded video sequence includes pictures that represent frames, and wherein the bitstream is stored in the storage medium; and
   sending the bitstream.

5. The method of claim 4, wherein the bitstream includes a sequence parameter set (SPS), and wherein the flag is obtained from the SPS.

6. The method of claim 5, wherein the IRAP picture includes a first field of a frame, and wherein the non-leading picture preceding the initial leading picture includes a second field of the frame.

7. A non-transitory computer-readable storage medium storing a bitstream that, when decoded by a coding device, is used by the coding device to generate a video, the bitstream comprising:
   a sequential field flag (field_seq_flag) and a plurality of coded pictures including an intra random access point (IRAP) picture and one or more non-leading pictures associated with the IRAP picture, wherein any leading pictures associated with the IRAP picture precede, in decoding order, all non-leading pictures associated with the IRAP picture when the flag is set to zero, wherein at most one non-leading picture precedes, in decoding order, an initial leading picture associated with the IRAP picture, wherein no non-leading pictures are positioned between the initial leading picture and a final leading picture in decoding order when the flag is set to one, wherein the field_seq_flag is set to one when a coded video sequence includes pictures that represent fields, and wherein the field_seq_flag is set to zero when the coded video sequence includes pictures that represent frames.

8. The storage medium of claim 7, wherein the bitstream includes a sequence parameter set, SPS, and wherein the flag is obtained from the SPS.

9. The storage medium of claim 8, wherein the IRAP picture includes a first field of a frame, and wherein the non-leading picture preceding the initial leading picture includes a second field of the frame.

* * * * *